(12) United States Patent
Landis et al.

(10) Patent No.: US 11,671,877 B2
(45) Date of Patent: Jun. 6, 2023

(54) TECHNIQUES FOR PERFORMING RATE MATCHING AROUND RESOURCE ELEMENTS USED FOR TONE RESERVATION

(71) Applicant: QUALCOMM Incorporated, San Diego, CA (US)

(72) Inventors: Shay Landis, Hod Hasharon (IL); Idan Michael Horn, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/213,188

(22) Filed: Mar. 25, 2021

(65) Prior Publication Data

US 2022/0312276 A1    Sep. 29, 2022

(51) Int. Cl.
*H04W 28/26*    (2009.01)
*H04L 1/00*    (2006.01)
*H04L 27/26*    (2006.01)
*H04L 5/00*    (2006.01)
*H04W 24/08*    (2009.01)
*H04W 72/51*    (2023.01)

(52) U.S. Cl.
CPC .......... *H04W 28/26* (2013.01); *H04L 1/0013* (2013.01); *H04L 5/0048* (2013.01); *H04L 27/262* (2013.01); *H04W 24/08* (2013.01); *H04W 72/51* (2023.01)

(58) Field of Classification Search
CPC ... H04W 28/26; H04W 24/08; H04W 72/048; H04L 1/0013; H04L 5/0048; H04L 27/262; H04L 5/1438; H04L 5/0007; H04L 1/0606
See application file for complete search history.

(56) References Cited

U.S. PATENT DOCUMENTS

| | | | | |
|---|---|---|---|---|
| 2012/0058791 | A1* | 3/2012 | Bhattad | H04L 1/0606 455/509 |
| 2012/0113917 | A1* | 5/2012 | Gaal | H04L 5/1438 370/329 |
| 2015/0195068 | A1* | 7/2015 | Kim | H04L 5/0048 370/329 |
| 2022/0159678 | A1* | 5/2022 | Back | H04L 5/0007 |

* cited by examiner

*Primary Examiner* — Kiet Tang
(74) *Attorney, Agent, or Firm* — Holland & Hart LLP/Qualcomm Incorporated

(57) ABSTRACT

Methods, systems, and devices for wireless communications are described. A base station may determine to apply tone reservation to a downlink transmission from the base station to a user equipment (UE), and may select to rate match data of the downlink transmission around selected resource elements for the tone reservation instead of puncturing the data of the downlink transmission. The base station may transmit, to the UE, a message indicating that tone reservation is applied to the downlink transmission via rate matching, and transmit the downlink transmission including the data rate matched around the selected resource elements used for tone reservation. The UE may identify the selected resource elements used for tone reservation based on an estimation of a channel between the UE and the base station, and decode the data of the downlink transmission via rate matching around the selected resource elements used for tone reservation.

30 Claims, 16 Drawing Sheets

TECHNIQUES FOR PERFORMING RATE MATCHING AROUND RESOURCE ELEMENTS USED FOR TONE RESERVATION

FIELD OF TECHNOLOGY

The following relates to wireless communications, including techniques for performing rate matching around resource elements used for tone reservation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a signal transmitted by a transmitting device may have an associated peak-to-average-power ratio (PAPR). A high PAPR may be problematic. In some instances, a high PAPR may decrease the efficiency of a power amplifier (PA) amplifying the signal at the transmitting device. In some instances, a high PAPR may cause a PA to operate non-linearly. In other instances, a high PAPR may be in violation of transmission power restrictions. Reducing a PAPR of a transmitted signal may be beneficial.

SUMMARY

The described techniques relate to improved methods, systems, devices, and apparatuses that support techniques for performing rate matching around resource elements used for tone reservation. Generally, the described techniques provide for performing rate matching procedures and tone reservation based on a channel between a transmitting device and receiving device to reduce peak-to-average-ratio (PAPR) and improve overhead usage. A user equipment (UE) and a base station may individually determine which resource elements are to be used for tone reservation so that the resource elements need not be conveyed from the transmitting device to the receiving device. Further, the transmitting device may determine to perform rate matching around or perform puncturing using the resource elements selected for tone reservation based on a condition of the channel between the transmitting device and receiving device so as to improve performance of the transmission. For example, a base station may determine to apply tone reservation to a downlink transmission from the base station to a UE, and may select to rate match data of the downlink transmission around selected resource elements for the tone reservation instead of puncturing the data of the downlink transmission. The base station may transmit, to the UE, a message indicating that tone reservation is applied to the downlink transmission via rate matching, and transmit the downlink transmission including the data rate matched around the selected resource elements used for tone reservation. The UE may identify the selected resource elements used for tone reservation based on an estimation of a channel between the UE and the base station, and decode the data of the downlink transmission via rate matching around the selected resource elements used for tone reservation.

A method for wireless communications at a UE is described. The method may include receiving, from a base station, a message indicating that tone reservation is applied to a downlink transmission via rate matching, receiving the downlink transmission including data rate matched around selected resource elements used for tone reservation, identifying the selected resource elements used for tone reservation based on an estimation of a channel between the UE and the base station, and decoding the data of the downlink transmission via rate matching around the selected resource elements used for tone reservation.

An apparatus for wireless communications is described. The apparatus may include a processor, memory coupled with the processor, and instructions stored in the memory. The instructions may be executable by the processor to cause the apparatus to receive, from a base station, a message indicating that tone reservation is applied to a downlink transmission via rate matching, receive the downlink transmission including data rate matched around selected resource elements used for tone reservation, identify the selected resource elements used for tone reservation based on an estimation of a channel between the UE and the base station, and decode the data of the downlink transmission via rate matching around the selected resource elements used for tone reservation.

Another apparatus for wireless communications is described. The apparatus may include means for receiving, from a base station, a message indicating that tone reservation is applied to a downlink transmission via rate matching, means for receiving the downlink transmission including data rate matched around selected resource elements used for tone reservation, means for identifying the selected resource elements used for tone reservation based on an estimation of a channel between the UE and the base station, and means for decoding the data of the downlink transmission via rate matching around the selected resource elements used for tone reservation.

A non-transitory computer-readable medium storing code for wireless communications at a UE is described. The code may include instructions executable by a processor to receive, from a base station, a message indicating that tone reservation is applied to a downlink transmission via rate matching, receive the downlink transmission including data rate matched around selected resource elements used for tone reservation, identify the selected resource elements used for tone reservation based on an estimation of a channel between the UE and the base station, and decode the data of the downlink transmission via rate matching around the selected resource elements used for tone reservation.

Some examples of the method, apparatuses, and non-transitory computer-readable medium described herein may further include operations, features, means, or instructions for receiving a value indicating a number of resource elements selected for tone reservation.

In some examples of the method, apparatuses, and non-transitory computer-readable medium described herein, identifying the selected resource elements may include operations, features, means, or instructions for identifying resource elements associated with lowest energy levels of the channel, where a number of identified resource elements may be equal to the value.

In some examples of the method, apparatuses, and non-transitory computer-readable medium described herein, the value may be a percentage of a total number of resource elements of the downlink transmission.

Some examples of the method, apparatuses, and non-transitory computer-readable medium described herein may further include operations, features, means, or instructions for receiving one or more demodulation reference signals from the base station and performing one or more measurements on the one or more demodulation reference signals to determine the estimation of the channel.

In some examples of the method, apparatuses, and non-transitory computer-readable medium described herein, the estimation of the channel may be based on channel reciprocity of a downlink channel and an uplink channel between the base station and the UE.

Some examples of the method, apparatuses, and non-transitory computer-readable medium described herein may further include operations, features, means, or instructions for determining that Doppler spread, or signal-to-noise ratio, or both may be used for determining a condition of the channel and transmitting an indication for the base station to use Doppler spread, or signal-to-noise ratio, or both for determining the condition of the channel.

In some examples of the method, apparatuses, and non-transitory computer-readable medium described herein, rate matching may be used based on the Doppler spread of the channel being below a first threshold and the signal-to-noise ratio of the channel being greater than a second threshold.

Some examples of the method, apparatuses, and non-transitory computer-readable medium described herein may further include operations, features, means, or instructions for transmitting a capability message indicating that the UE supports rate matching around resource elements used for tone reservation.

In some examples of the method, apparatuses, and non-transitory computer-readable medium described herein, a power associated with a PAPR reducing signal in the selected resource elements may be less than or equal to a threshold multiplied by an average power associated with resource elements of the downlink transmission used for data transmission.

In some examples of the method, apparatuses, and non-transitory computer-readable medium described herein, receiving the message indicating that tone reservation may be applied to the downlink transmission via rate matching may include operations, features, means, or instructions for receiving a downlink control information (DCI) message or medium access control (MAC) control element (MAC-CE) message including the message indicating that tone reservation may be applied to the downlink transmission via rate matching.

A method for wireless communications at a base station is described. The method may include determining to apply tone reservation to a downlink transmission from the base station to a UE, selecting to rate match data of the downlink transmission around selected resource elements for the tone reservation instead of puncturing the data of the downlink transmission, transmitting, to the UE, a message indicating that tone reservation is applied to the downlink transmission via rate matching, and transmitting the downlink transmission including the data rate matched around the selected resource elements used for tone reservation.

An apparatus for wireless communications is described. The apparatus may include a processor, memory coupled with the processor, and instructions stored in the memory. The instructions may be executable by the processor to cause the apparatus to determine to apply tone reservation to a downlink transmission from the base station to a UE, select to rate match data of the downlink transmission around selected resource elements for the tone reservation instead of puncturing the data of the downlink transmission, transmit, to the UE, a message indicating that tone reservation is applied to the downlink transmission via rate matching, and transmit the downlink transmission including the data rate matched around the selected resource elements used for tone reservation.

Another apparatus for wireless communications is described. The apparatus may include means for determining to apply tone reservation to a downlink transmission from the base station to a UE, means for selecting to rate match data of the downlink transmission around selected resource elements for the tone reservation instead of puncturing the data of the downlink transmission, means for transmitting, to the UE, a message indicating that tone reservation is applied to the downlink transmission via rate matching, and means for transmitting the downlink transmission including the data rate matched around the selected resource elements used for tone reservation.

A non-transitory computer-readable medium storing code for wireless communications at a base station is described. The code may include instructions executable by a processor to determine to apply tone reservation to a downlink transmission from the base station to a UE, select to rate match data of the downlink transmission around selected resource elements for the tone reservation instead of puncturing the data of the downlink transmission, transmit, to the UE, a message indicating that tone reservation is applied to the downlink transmission via rate matching, and transmit the downlink transmission including the data rate matched around the selected resource elements used for tone reservation.

Some examples of the method, apparatuses, and non-transitory computer-readable medium described herein may further include operations, features, means, or instructions for determining an estimation of a channel between the base station and the UE and selecting resource elements of the downlink transmission to use for tone reservation based on the estimation of the channel.

In some examples of the method, apparatuses, and non-transitory computer-readable medium described herein, selecting the resource elements may include operations, features, means, or instructions for identifying a predetermined number of tone reservations, selecting the resource elements associated with lowest energy levels of the channel, where a number of resource elements selected may be equal to the predetermined number of tone reservations, and inserting a PAPR reducing signal in the selected resource elements.

Some examples of the method, apparatuses, and non-transitory computer-readable medium described herein may further include operations, features, means, or instructions for determining that a PAPR of the downlink transmission may be less than a predetermined threshold, identifying a second number of tone reservations higher than the predetermined number of tone reservations, selecting the resource elements associated with the lowest energy levels of the channel, where the number of resource elements selected may be equal to the second number of tone reservations, and inserting a PAPR reducing signal in the selected resource elements.

Some examples of the method, apparatuses, and non-transitory computer-readable medium described herein may further include operations, features, means, or instructions for receiving one or more sounding reference signals from the UE and performing one or more measurements on the one or more sounding reference signals to determine the estimation of the channel.

In some examples of the method, apparatuses, and non-transitory computer-readable medium described herein, the estimation of the channel may be based on channel reciprocity of a downlink channel and an uplink channel between the base station and the UE.

Some examples of the method, apparatuses, and non-transitory computer-readable medium described herein may further include operations, features, means, or instructions for determining a condition of a channel between the UE and the base station, the condition including a Doppler spread of the channel, or a signal-to-noise ratio of the channel.

Some examples of the method, apparatuses, and non-transitory computer-readable medium described herein may further include operations, features, means, or instructions for determining that the Doppler spread of the channel may be below a threshold, where selecting to rate match may be based on the Doppler spread being below the threshold.

Some examples of the method, apparatuses, and non-transitory computer-readable medium described herein may further include operations, features, means, or instructions for determining that the signal-to-noise ratio of the channel may be greater than a threshold, where selecting to rate match may be based on the signal-to-noise ratio being greater than the threshold.

Some examples of the method, apparatuses, and non-transitory computer-readable medium described herein may further include operations, features, means, or instructions for receiving, from the UE, an indication of the signal-to-noise ratio associated with the channel.

Some examples of the method, apparatuses, and non-transitory computer-readable medium described herein may further include operations, features, means, or instructions for receiving, from the UE, an indication for the base station to use doppler spread, or signal-to-noise ratio, or both for determining to select rate matching or puncturing.

Some examples of the method, apparatuses, and non-transitory computer-readable medium described herein may further include operations, features, means, or instructions for transmitting a value associated with a number of resource elements selected for tone reservation.

In some examples of the method, apparatuses, and non-transitory computer-readable medium described herein, the value may be a percentage of a total number of resource elements of the downlink transmission.

Some examples of the method, apparatuses, and non-transitory computer-readable medium described herein may further include operations, features, means, or instructions for receiving a capability message from the UE indicating that the UE supports rate matching around resource elements used for tone reservation.

In some examples of the method, apparatuses, and non-transitory computer-readable medium described herein, a power associated with a PAPR reducing signal in the selected resource elements may be less than or equal to a threshold multiplied by an average power associated with resource elements of the downlink transmission used for data transmission.

In some examples of the method, apparatuses, and non-transitory computer-readable medium described herein, transmitting the message indicating that tone reservation may be applied to the downlink transmission via rate matching may include operations, features, means, or instructions for transmitting a radio resource control message, a DCI message or MAC-CE message including the message indicating that tone reservation may be applied to the downlink transmission via rate matching.

DETAILED DESCRIPTION

Figure 1:
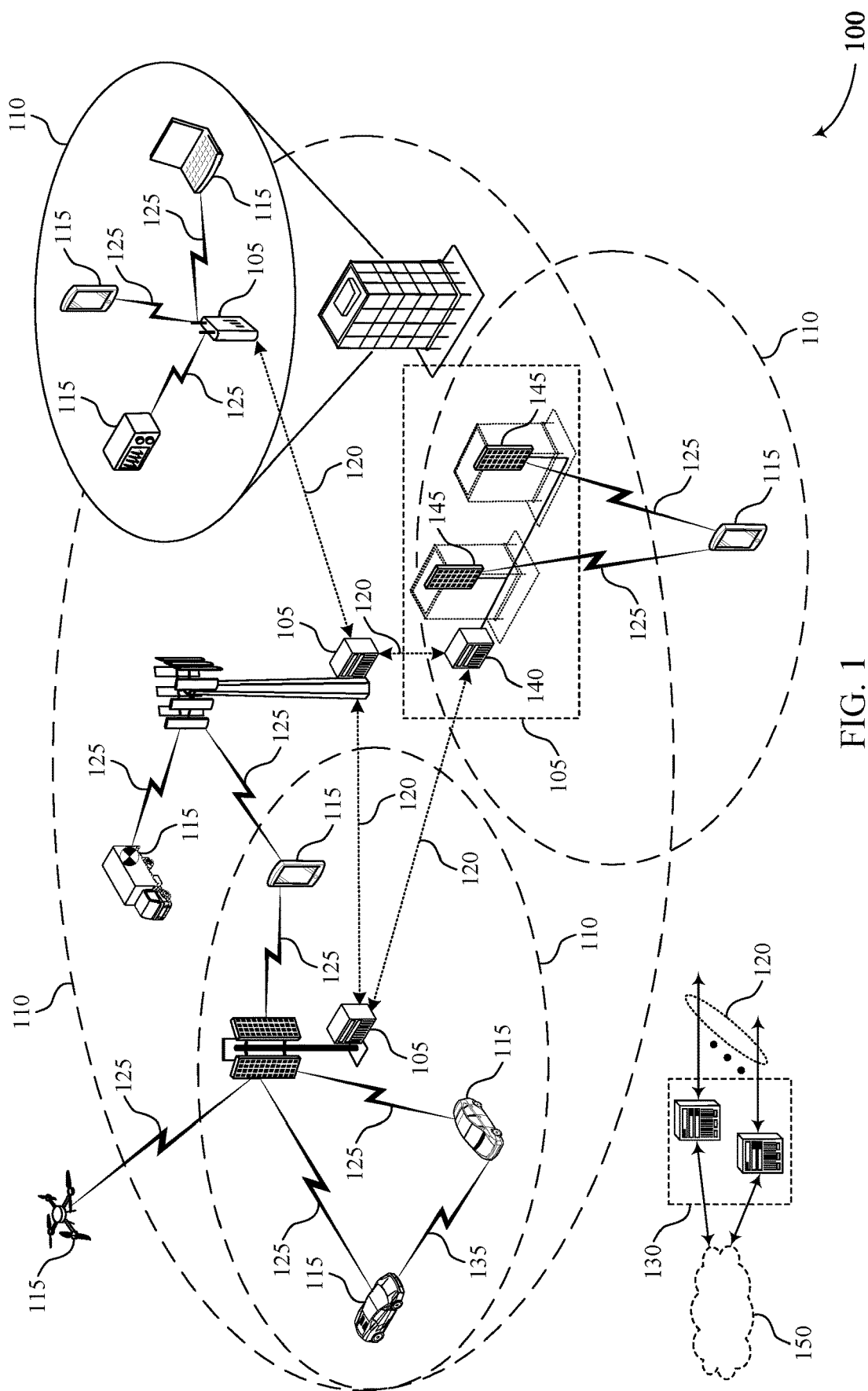
FIG. 1 illustrates an example of a wireless communications system that supports techniques for performing rate matching around resource elements used for tone reservation in accordance with aspects of the present disclosure.

In some wireless communications systems (e.g., 5G New Radio (NR) systems) a transmitting device (e.g., a UE, a base station) may transmit one or more signals (e.g., control signals, data signals) to one or more receiving devices (e.g., a UE, a base station), such as via orthogonal frequency division multiplexing (OFDM) signaling techniques. In some cases, a transmitting device may include a power amplifier (PA) to amplify signals before transmission.

OFDM signaling techniques and other signaling techniques may yield high peak-to-average-power ratios (PAPRs), which may reduce the efficiency of a PA at the transmitter. For example, the signals transmitted may combine to create a signal with one or more associated peaks. A ratio of a peak power of the combined signal to an average power of the combined signal may be referred to as a PAPR. As the PAPR increases, the PA used to amplify the combined signal may produce non-linearities in the signal, such as spectral growth, which may affect an error vector magnitude (EVM) associated with the signal. For instance, if a signal is associated with relatively high PAPR, an input back-off (IBO) of the PA may be increased to avoid significant signal distortion (e.g., and increasing the PA back-off may result in lower PA efficiency and less output power). Therefore, it may be desirable to reduce PAPR (e.g., reduce the ratio of a peak power of the transmitted signal to an average power of the transmitted signal) for wireless communications from a transmitting device to a receiving device.

To reduce PAPR, a transmitting device may perform tone reservation. For example, a transmitting device may perform, via a set of allocated resources, a transmission (e.g., an OFDM transmission) including a data signal and a PAPR reducing signal (e.g., peak-cancelation signal) for efficient PAPR reduction, where the peak-cancelation signal does not include data. For instance, a transmitting device (e.g., a base station, a UE) may identify data to include in a data signal of the transmission. The transmitting device may then process a PAPR reducing signal based on the identified data signal (e.g., where the PAPR reducing signal may reduce PAPR of the transmission via reducing the peaks of the corresponding data signal). In some communications systems, the transmitting device may transmit the PAPR reducing signal in a set of resource elements (e.g., a preconfigured set, a fixed set, a determined set) that may be referred to as tone reservation resource elements. The PAPR reducing signal transmitted over the tone reservation resource elements may be configured to cancel out or reduce an amplitude of the one or more peaks of the data signal. By reducing the one or more peaks, the PA may produce fewer or less significant non-linearities. However, in some cases, the set of resource elements may have otherwise been used for data transmission. As such, tone reservation may impact the throughput of a data transmission. Further, the transmitting device may transmit a report to the receiving device to indicate the set of resource elements used for tone reservation so that the receiving device may identify the set of resource elements and refrain from decoding them with the data transmission. Such a report may result in large overhead.

The techniques described herein may provide for performing rate matching procedures and tone reservation based on a channel between a transmitting device and a receiving device to reduce PAPR and improve overhead usage. A UE and a base station may be configured to individually determine which resource elements are to be used for tone reservation so that the resource elements need not be conveyed from the transmitting device to the receiving device. For example, the UE and the base station may be configured to identify a number of resource elements associated with the smallest power, where the number of resource elements may be preconfigured, or determined by the transmitting device and signaled to the receiving device. Further, the transmitting device may determine to perform rate matching around or perform puncturing using the resource elements selected for tone reservation based on a condition of the channel between the transmitting device and receiving device so as to improve performance of the transmission. For example, when the condition of the channel (or one or more conditions of the channel) is above a threshold, the transmitting device may perform rate matching around the tone reservation resource elements. When the condition of the channel (or one or more conditions of the channel) is less a threshold, the transmitting device may determine to puncture one or more of the tone reservation resource elements.

For example, a base station may determine to apply tone reservation to a downlink transmission from the base station to a UE, and select one or more tone reservation resource elements for transmitting a PAPR reducing signal based on a channel between the base station and the UE. The base station may select to rate match data of the downlink transmission around tone reservation resource elements instead of puncturing the data of the downlink transmission based on one or more parameters of the channel (e.g., Doppler spread, signal-to-noise (SNR) ratio). The base station may transmit, to the UE, a message indicating that tone reservation is applied to the downlink transmission via rate matching, and may transmit the downlink transmission including the data rate matched around the tone reservation resource elements. The UE may identify the selected resource elements used for tone reservation based on an estimation of a channel between the UE and the base station, and may decode the data of the downlink transmission via rate matching around the selected resource elements used for tone reservation.

Particular aspects of the subject matter described herein may be implemented to realize one or more advantages. The described techniques may support improvements in tone reservation procedures by reducing PAPR, reducing overhead, improving transmission performance, among other advantages. As such, supported techniques may include improved network operations and, in some examples, may promote network efficiencies, among other benefits.

Aspects of the disclosure are initially described in the context of wireless communications systems. Aspects are then described with reference to a tone reservation procedure and a process flow. Aspects of the disclosure are further illustrated by and described with reference to apparatus diagrams, system diagrams, and flowcharts that relate to techniques for performing rate matching around resource elements used for tone reservation.

FIG. 1 illustrates an example of a wireless communications system 100 that supports techniques for performing rate matching around resource elements used for tone reservation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station

105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a transmitting device may be configured to reduce PAPR by performing tone reservation. To perform tone reservation while mitigating overhead, a UE 115 and a base station 105 may individually determine which resource elements are to be used for tone reservation so that the resource elements need not be conveyed from the transmitting device (e.g., a UE 115, a base station 105) to the receiving device (e.g., a UE 115, a base station 105). Further, the transmitting device may determine to perform rate matching around or perform puncturing using the resource elements selected for tone reservation based on a condition of the channel between the transmitting device and receiving device so as to improve performance of the transmission. For example, a base station 105 may determine to apply tone reservation to a downlink transmission from the base station 105 to a UE 115, and may select to rate match data of the downlink transmission around selected resource elements for the tone reservation instead of puncturing the data of the downlink transmission. The base station 105 may transmit, to the UE 115, a message indicating that tone reservation is applied to the downlink transmission via rate matching, and transmit the downlink transmission including the data rate matched around the selected resource elements used for tone reservation. The UE 115 may identify the selected resource elements used for tone reservation based on an estimation of a channel between the UE 115 and the base station 105, and may decode the data of the downlink transmission via rate matching around the selected resource elements used for tone reservation.

Figure 2:
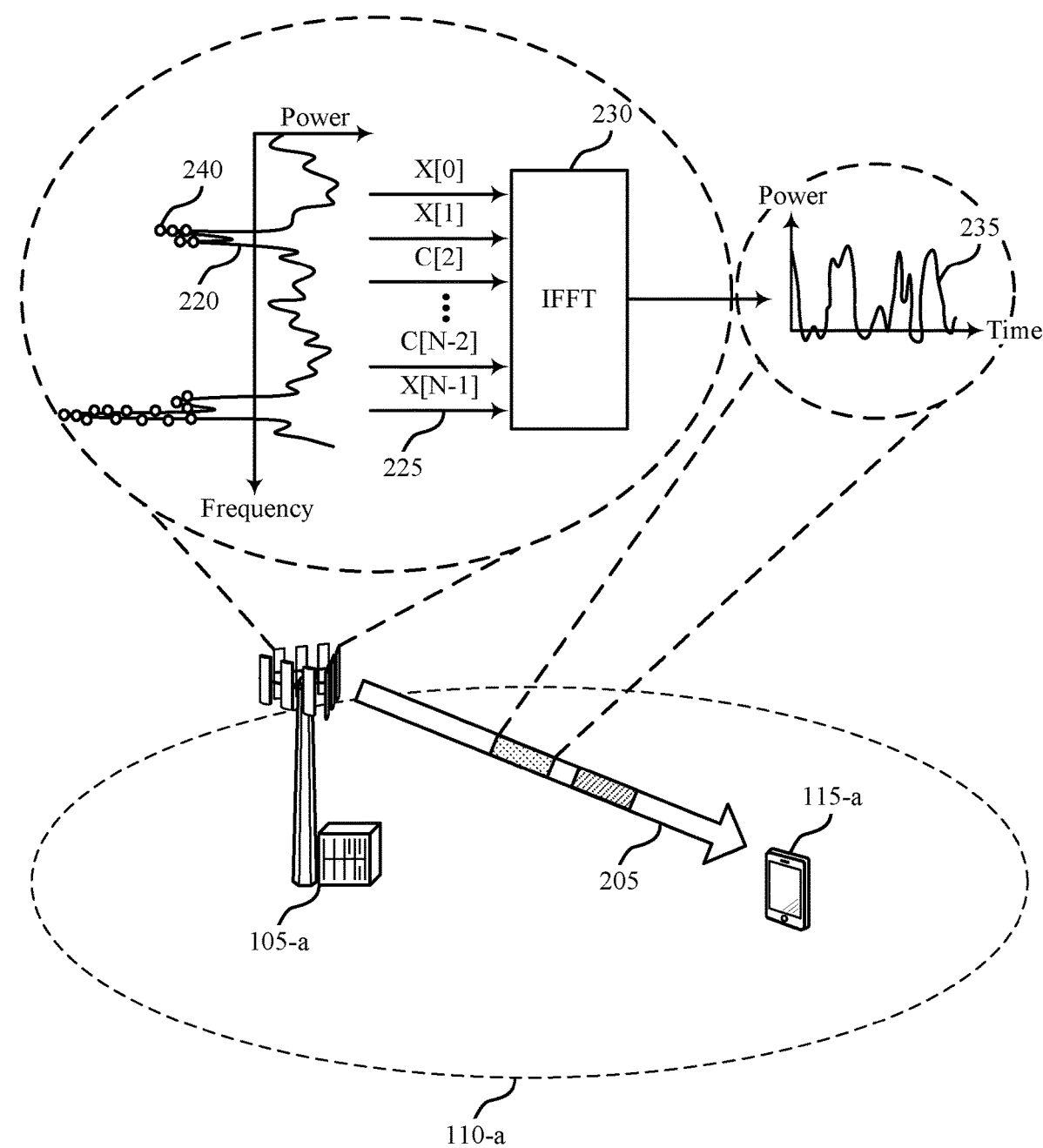
FIG. 2 illustrates an example of a wireless communications system that supports techniques for performing rate matching around resource elements used for tone reservation in accordance with aspects of the present disclosure.

FIG. 2 illustrates an example of a wireless communications system 200 that supports techniques for performing rate matching around resource elements used for tone reservation in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, base station 105-a may implement a tone reservation procedure to reduce PAPR of a transmission to UE 115-a. Additionally or alternatively, other wireless devices, such as UE 115-a may implement a tone reservation procedure as described herein.

In some cases, a transmitting device (e.g., base station 105-a, UE 115-a) may transmit one or more signals (e.g., data signals, control signals) to a receiving device (e.g., base station 105-a, UE 115-a) via a communication link 205 (e.g., an uplink communications link, a downlink communications link, a beamformed communication link). For example, base station 105-a may transmit a downlink transmission 215 to UE 115-a via communication link 205, where downlink transmission 215 may include data information, or control information. Downlink transmission 215 may span a set of resource elements and each resource element may span a set of frequencies (e.g., a subcarrier) and a duration of time (e.g., a number of seconds, a number of millisecond, a number of symbol, a number of slots). In some cases, base station 105-a may apply tone reservation techniques to the downlink transmission 215 to reduce the PAPR of the downlink transmission 215. For example, in some cases, the one or more signals (of downlink transmission 215) transmitted over the resource elements may combine to create a signal with one or more associated peaks. A ratio of a peak power of the combined signal to an average power of the combined signal may be referred to as a PAPR. As the PAPR increases, a PA used to amplify the combined signal may produce non-linearities in the signal, such as spectral growth, which may affect an EVM associated with the signal.

To reduce PAPR, base station 105-a may determine a PAPR reducing signal (e.g., peak-cancelation signal) based on the downlink transmission 215 (e.g., where the PAPR reducing signal may reduce PAPR of the downlink transmission 215 via reducing the peaks of the corresponding data signal). The PAPR reducing signal may be transmitted in one or more resource elements, which may be referred to as tone reservation resource elements. The PAPR reducing signal transmitted over the tone reservation resource elements may be configured to cancel out or reduce an amplitude of the one or more peaks of the combined downlink transmission 215. By reducing the one or more peaks, the PA may produce fewer or less significant non-linearities.

To determine which resource elements to use, the transmitting device, such as base station 105-a, may determine a channel estimation of the channel between UE 115-a and base station 105-a. Base station 105-a may use the channel estimation to determine the resource elements to use for tone reservation. For example, base station 105-a and/or UE 115-*a* may perform channel estimation procedures to estimate the channel between base station 105-*a* and UE 115-*a*. Channel estimation may refer to determining a channel frequency response (e.g., determining a power of a signal as a function of frequency) and/or determining one or more parameters associated with the channel (e.g., Doppler spread, signal-to-to-interference-plus-noise ratio (SINR), SNR). In some cases, base station 105-*a* may determine the channel estimation and transmit an indication of the channel estimation to UE 115-*a* and/or UE 115-*a* may determine the channel estimation and transmit the indication of the channel estimation to base station 105-*a*. In some implementations, as part of a channel estimation procedure, UE 115-*a* may transmit one or more sounding reference signals (SRSs) (or some other reference signals) periodically or aperiodically to base station 105-*a*. Base station 105-*a* may receive and perform measurements on one or more of the SRSs to estimate the channel in the uplink direction. In some cases, such as in TDD systems and/or at high frequencies (e.g., mmWave, FR2, Sub-Thz, FR4, etc.), the channel may be the same (or nearly the same) in the uplink direction and the downlink direction, which may be referred to as channel reciprocity. In some cases, base station 105-*a* may determine channel reciprocity based on one or more channel conditions.

Accordingly, base station 105-*a* may determine one or more conditions of the channel. In some cases, base station 105-*a* may perform one or more measurements to determine the channel conditions and/or base station 105-*a* may receive an indication from UE 115-*a* associated with the channel conditions. For example, base station 105-*a* may receive a report from UE 115-*a* that may include an indication of one or more channel conditions, such as SINR, SNR, Doppler spread, etc. At high SNRs and/or low Doppler spread, the channel estimation in the uplink and downlink may be the same or similar such that the downlink and uplink channel may have channel reciprocity. If there is channel reciprocity between the uplink and downlink channels, base station 105-*a* may assume the channel in the downlink is the same or similar as the channel estimation determined for the uplink.

Upon determining the channel estimation and/or the one or more channel conditions, base station 105-*a* may determine whether to perform tone reservation. For example, if the channel estimation and/or channel conditions indicate a high PAPR associated with the channel, such as a PAPR above a configured threshold, base station 105-*a* may determine to perform tone reservation on one or more downlink transmissions to UE 115-*a*.

In some communications systems, a transmitting device may use a tone reservation algorithm to determine resource elements to use for tone reservation. However, such tone reservation algorithm may determine to use resource elements that were previously used or may be currently used for data transmission. The tone reservation algorithm may not consider channel estimation information to determine the tone reservation resource elements and as such, may select resource elements that are capable of transmitting a strong signal based on the channel estimation. To transmit the PAPR reducing signal in the tone reservation resource elements, the transmitting device may not transmit data in the tone reservation resource elements. As such, tone reservation may reduce throughput, in some cases.

To improve (maintain) throughput while using tone reservation, a transmitting device may be configured to select resource elements for tone reservation based on channel estimation information. For example, base station 105-*a* may locate tone reservations on resource elements (e.g., subcarriers) associated with small energy post channel estimation. To perform tone reservation based on channel estimation, base station 105-*a* may be configured with a number of tone reservations (e.g., a default number, a starting number) or a threshold for determining tone reservations. In some cases, the number of tone reservations may be represented as a percentage. For example, base station 105-*a* may be configured to identify five percent of the resource elements in a resource allocation associated with the smallest energy, or base station 105-*a* may be configured to identify ten resource elements with the smallest energy. Accordingly, base station 105-*a* may identify a number of resource elements to use for tone reservation, where the number of resource elements are equal to the number of tone reservations. Base station 105-*a* may locate the resource elements to use for tone reservation (e.g., the weakest resource elements) based on the channel estimation. For example, as part of the channel estimation procedure, base station 105-*a* may determine a channel frequency response 220 (e.g., channel power as a function of subcarrier indices). Using the channel frequency response 220, base station 105-*a* may locate resource elements associated with the smallest energy (e.g., lowest channel power) and base station 105-*a* may select a number of the located resource elements equal to the number of tone reservation (e.g., five percent of the smallest energy resource elements). The number of located resource elements may be referred to as tone reservation location 240. In some cases, base station 105-*a* may be configured with a threshold for determining tone reservations, such as a power threshold (e.g., energy value). Base station 105-*a* may be configured to select all resource elements with a power (e.g., energy) below the power threshold.

Upon determining the tone reservation locations 240, base station 105-*a* may perform tone reservation optimization to optimize the PAPR. For example, base station 105-*a* may determine a PAPR reducing signal to apply to each tone reservation location 240, as further described with reference to FIG. 3. In some implementations, the power associated with the PAPR reducing signal (e.g., a maximum power) may not be greater than a threshold, where the threshold may be a power associated with transmitting the data (e.g., physical downlink shared channel (PDSCH) subcarrier power). In some cases, the threshold may be an average power, a lowest power, or a highest power used to transmit the data. In some cases, the power of the PAPR reducing signal may not be greater than the average power used to transmit data multiplied by a threshold (e.g., PAPR reduction signal power<(Average data power×threshold)). For example, the PAPR reducing signal power may be below the average power used to transmit data resource elements. In some cases, the PAPR signal may be below the average power multiplied by a threshold. In some cases, the PAPR reducing signal power may be below the lowest power used to transmit a data resource element. In some cases, the PAPR signal may be below the highest power used to transmit a data resource element.

As part of the optimization procedure, base station 105-*a* may determine whether the downlink transmission 215 including the data and PAPR reducing signal in the tone reservation locations 240 will meet a PAPR threshold. For example, base station 105-*a* may be configured with or otherwise determine a PAPR threshold. If the downlink transmission 215 has a PAPR that is less than or equal to the PAPR threshold, then the base station 105 determined the appropriate number of tone reservation locations 240 and an appropriate PAPR reducing signal. However, if the downlink transmission 215 has a PAPR greater than the PAPR threshold then base station 105-a may need select additional tone reservation locations 240 and/or re-optimize the PAPR reducing signal. For example, as the PAPR reducing signal is constrained by a threshold, base station 105-a may locate additional tone reservation locations 240 to lower the PAPR of the downlink transmission 215. As such, when the PAPR of the downlink transmission 215 is determined to be greater than the PAPR threshold, base station 105-a may have to increase the number of tone reservations to be greater than the default (e.g., configured) number, locate the additional resource elements up to the new number of tone reservations, apply tone reservation optimization to determine an optimized PAPR reducing signal (e.g., constrained by maximum power), and determine whether the PAPR of the downlink transmission 215 meets the PAPR threshold. Base station 105-a may perform such a procedure until the downlink transmission 215 is associated with a PAPR that is equal to or less than the PAPR threshold.

For example, base station 105-a may determine n tone reservation locations 240 based on the channel frequency response 220. Based on the optimization procedure, base station 105-a may determine to apply a PAPR reducing signal, C, to the n tone reservation locations 240 (e.g., input subcarriers 225, resource elements). Base station 105-a may apply the data signal, X, to the remaining resource elements (e.g., input subcarriers 225, non-tone reservation resource elements). Base station 105-a may provide the input subcarriers 225 (e.g., all resource elements of a resource allocation include non-tone reservation resource elements, and tone reservation resource elements) to an inverse fast Fourier transform (IFFT) block 230. The IFFT block 230 may convert the subcarriers to a time domain, and thus convert channel frequency response 220 to a channel time response 235 with a reduced PAPR.

In some implementations, based on the channel estimation and/or channel conditions, base station 105-a may determine whether to perform rate matching around the tone reservation resource elements or to puncture the tone reservation resource elements. A transmitting device, such as base station 105-a may perform rate matching or puncturing to match the number of bits of a transport block associated with a transmission to the number of bits the transmitting device may transmit based on a given resource allocation. In the case of rate matching, the transmitting device may map the bits to available resource elements, such that the transmitting device may not map bits to tone reservation resource elements (e.g., the bits are rate matched around the tone reservation resource elements). In the case of puncturing, the transmitting device may map the bits to all resource elements of a given resource allocation, such that the transmitting device may map the bits to resource elements that may be used for tone reservation. In some cases, the transmitting device may be configured to perform rate matching when the channel estimation between the UE 115 and the base station 105 are the same or nearly the same, and perform puncturing when the channel estimation in the uplink and downlink are different. For example, at high SNRs (e.g., SNRs above a threshold) and/or low Doppler spread (e.g., Doppler spread below a threshold), base station 105-a may determine to perform rate matching. If base station 105-a determines to perform rate matching, base station 105-a may use the remaining resource elements (e.g., non-tone reservation resource elements) to map the downlink transmission (e.g., PDSCH) to channel bits.

In some cases, UE 115-a may transmit a report to base station 105-a that indicates whether UE 115-a supports tone reservation around tone reservation resource elements. UE 115-a may transmit the report aperiodically, semi-persistently, or dynamically, via radio resource control (RRC) signaling, medium access control (MAC) control element (MAC-CE) signaling, or uplink control information (UCI) signaling, respectively. As such, performing rate matching around the tone reservation resource elements may be based on the capability of UE 115-a. In some implementations, UE 115-a may transmit a report that may indicate channel conditions that may be used by base station 105-a for determining whether to perform rate matching and/or may indicate channel conditions that should not be used by base station 105-a for determining whether to perform rate matching. For example, UE 115-a may indicate whether SNR and/or Doppler shift are appropriate for determining whether to rate match, and base station 105-a may use Doppler spread and/or SNR for determining whether to perform rate matching based on the report from UE 115-a. UE 115-a may transmit the report aperiodically, semi-persistently, or dynamically, via RRC signaling, MAC-CE signaling, or UCI signaling, respectively.

Prior to transmitting the downlink transmission 215, base station 105-a may transmit a report to UE 115-a that may include an indication of whether base station 105-a applied tone reservation (e.g., tone reservation indication 210) to a scheduled downlink transmission 215. The indication may be a 1-bit indication, where a 0 may indicate that base station 105-a did not use tone reservation and a 1 may indicate that base station 105-a did use tone reservation. In some cases, the report may include the number of tone reservation locations 240 used in the scheduled downlink transmission 215. In some cases, base station 105-a may indicate a percentage of resource elements in a resource allocation used for tone reservation. In some cases, the report may include an indication of whether base station 105-a applied rate matching to the scheduled downlink transmission 215. For example, base station 105-a may indicate that rate matching was applied or was not applied. In another example, base station 105-a may indicate that rate matching was applied or that puncturing was applied. Base station 105-a may transmit the report aperiodically, semi-persistently, or dynamically, via RRC signaling, MAC-CE signaling, or downlink control information (DCI) signaling (e.g., with k0 larger than zero), respectively.

Accordingly, UE 115-a may receive the report and identify whether tone reservation is applied to the scheduled downlink transmission 215, identify a number of tone reservation locations 240 used for the tone reservation, identify whether rate matching or puncturing was applied, or a combination thereof. Upon transmitting the report to UE 115-a, base station 105-a may transmit the downlink transmission 215 as a channel time response 235. UE 115-a may perform channel estimation procedures to determine the downlink channel response (e.g., channel time response 235, or a response related to channel time response 235) and/or may receive an indication from base station 105-a indicating the channel response, such as if there is channel reciprocity between the uplink and downlink channels between UE 115-a and base station 105-a. In some cases, UE 115-a may receive one or more DMRSs as part of the downlink transmission 215, and use the one or more DMRSs to determine the channel response. UE 115-a may identify a number of resource elements associated with the smallest energy equal to the indicated number of tone reservation locations 240. For example, UE 115-a may identify the resource elements based on the one or more DMRSs. UE 115-a may determine that the identified resource elements may be used for tone reservation. In the case of rate matching, where UE 115-a received an indication that rate matching was applied to the downlink transmission, UE 15-a may rate match (e.g., receive and decode the data) around the identified resource elements in the data symbol and perform a decoding procedure to determine the data included in the remaining resource elements (e.g., non-tone reservation resource elements).

Figure 3:
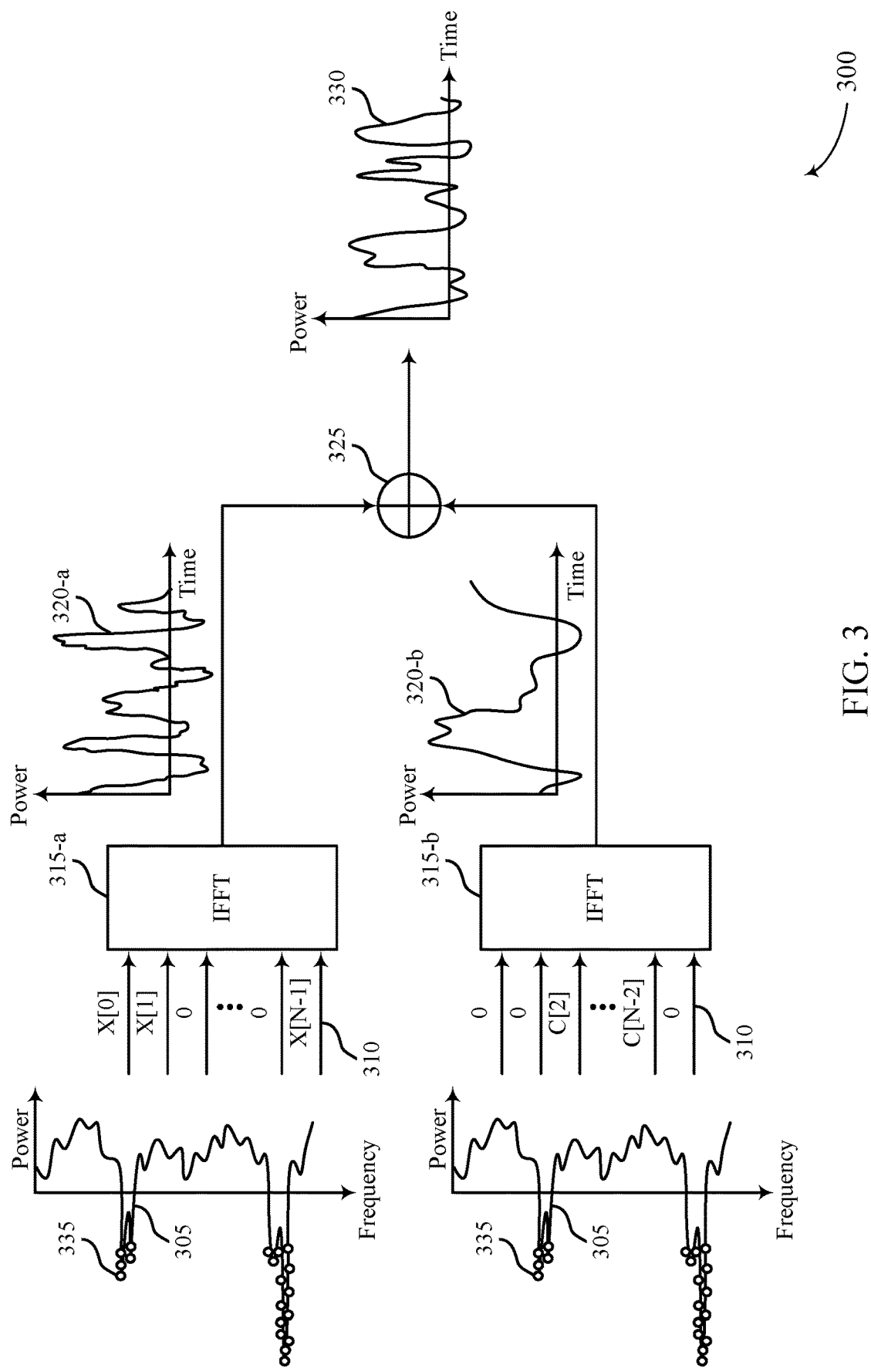
FIG. 3 illustrates an example of a tone reservation procedure that supports techniques for performing rate matching around resource elements used for tone reservation in accordance with aspects of the present disclosure.

FIG. 3 illustrates an example of a tone reservation procedure 300 that supports techniques for performing rate matching around resource elements used for tone reservation in accordance with aspects of the present disclosure. The tone reservation procedure 300 may be implemented by a base station or a UE, which may be examples of a base station and a UE as described with reference to FIGS. 1 and 2. In some cases, a base station may implement the tone reservation procedure 300 to reduce PAPR of a transmission to one or more UEs. Additionally or alternatively, other wireless devices, such as a UE may implement a tone reservation procedure 300 as described herein.

As described herein, a transmitting device (e.g., a base station, a UE) may perform tone reservation by including a PAPR reducing signal in a set of tone reservation resource elements. The transmitting device may calculate the PAPR reducing signal based on a channel response (e.g., channel estimation) between the transmitting device and the receiving device. The transmitting device may determine one or more peaks associated with the channel response and the transmitting device may configure the PAPR reducing signal to cancel out or reduce an amplitude of the one or more peaks of the data signal.

For example, a base station may determine the channel response between the base station and a UE is equal to channel frequency response 305. The base station may determine n tone reservation locations 335 (e.g., resource elements allocated for tone reservation) from the channel frequency response 305 based on a number of tone reservations (e.g., a default number, a preconfigured number), where the n tone reservation locations 335 include the n weakest resource elements in a resource allocation. The base station may determine to apply a PAPR reducing signal to tone reservation locations 335. In some cases, the base station may perform a tone reservation optimization procedure to determine a PAPR reducing signal (e.g., optimal PAPR reducing signal). In some implementations, the power associated with the PAPR reducing signal (e.g., a maximum power) may not be greater than a threshold, where the threshold may be a power associated with transmitting the data (e.g., PDSCH subcarrier power). In some cases, the threshold may be an average power, a lowest power, or a highest power used to transmit the data. In some cases, the power of the PAPR reducing signal may not be greater than the average power used to transmit data multiplied by a threshold (e.g., PAPR reduction signal power<(Average data power×threshold)).

Upon determining the PAPR reducing signal, the base station may apply the PAPR reducing signal to the tone reservation locations 335 and apply the data to the remaining resource elements (e.g., non-tone reservation resource elements). The base station may input the PAPR reducing signals of each tone reservation location 335 (e.g., input subcarriers 225) and each data signal applied to the remaining resource elements (e.g., input subcarriers 225) into one or more IFFT blocks 315 to determine a channel time response 330.

For example, the base station may apply the PAPR reducing signal, C (e.g., C[2], C[N−2]), to the n tone reservation locations 240 (e.g., input subcarriers 225, resource elements). The base station may apply zeros to the remaining resource elements (e.g., non-tone reservation resource elements). The base station may input the zeros and PAPR reducing signals associated with each resource element in a resource allocation (e.g., input subcarriers 310) into an IFFT block 315-b. The IFFT block 315-b may convert the subcarriers to a time domain, and thus convert channel frequency response 305 to an intermediate channel time response 320-b. Intermediate channel time response 320-b may represent the PAPR reducing signal over time.

Simultaneously (or near simultaneously) to generating intermediate channel time response 320-b, the base station may generate intermediate channel time response 320-a. The base station may apply a data signal, X, to the remaining resource elements (e.g., input subcarriers 225, non-tone reservation resource elements). The base station may apply zeros to the tone reservation locations 335. The base station may input the zeros and data signals associated with each resource element in a resource allocation (e.g., input subcarriers 310) into an IFFT block 315-a. The IFFT block 315-a may convert the subcarriers to a time domain, and thus convert channel frequency response 305 to an intermediate channel time response 320-a. Intermediate channel time response 320-a may represent the data signal over time without reduced PAPR.

To reduce PAPR of the intermediate channel time response 320-a, the base station may sum (e.g., direct sum, linear sum) intermediate channel time response 320-a and intermediate channel time response 320-b via summation block 325. The output of summation block 325 may be channel time response 330 with a reduce PAPR compared to intermediate channel time response 320-a. In some cases, IFFT block 315-a and IFFT block 315-b may be represented as a single IFFT block, such as IFFT block 230 with reference to FIG. 2.

In some cases, a base station may perform an optimization procedure to further reduce the PAPR of a downlink transmission while maintaining a threshold throughput. For example, the base station may determine whether a downlink transmission including the data and PAPR reducing signal in the tone reservation locations 335 will meet a PAPR threshold. For example, the base station may be configured with or otherwise determine a PAPR threshold. If the downlink transmission (e.g., channel time response 330) has a PAPR that is less than or equal to the PAPR threshold, then the base station determined the appropriate number of tone reservation locations 335 and an appropriate PAPR reducing signal (e.g., C). However, if the downlink transmission has a PAPR greater than the PAPR threshold then the base station may select additional tone reservation locations 335 and/or re-optimize the PAPR reducing signal. For example, as the PAPR reducing signal is constrained by a threshold, the base station may locate additional tone reservation locations 335 to lower the PAPR of the downlink transmission. As such, when the PAPR of the downlink transmission is determined to be greater than the PAPR threshold, the base station may have to increase the number of tone reservations to be greater than the default (e.g., configured) number, locate the additional resource elements up to the new number of tone reservations, apply tone reservation optimization to determine an optimized PAPR reducing signal (e.g., constrained by maximum power), and determine whether the PAPR of the downlink transmission meets the PAPR threshold. To determine whether the PAPR of the downlink transmission meets the PAPR threshold, the base station may generate a new channel time response 330 by generating new intermediate channel time responses 320-a and 320-b and summing them. The base station may perform such a procedure until the downlink transmission is associated with a PAPR that is equal to or less than the PAPR threshold.

Figure 4:
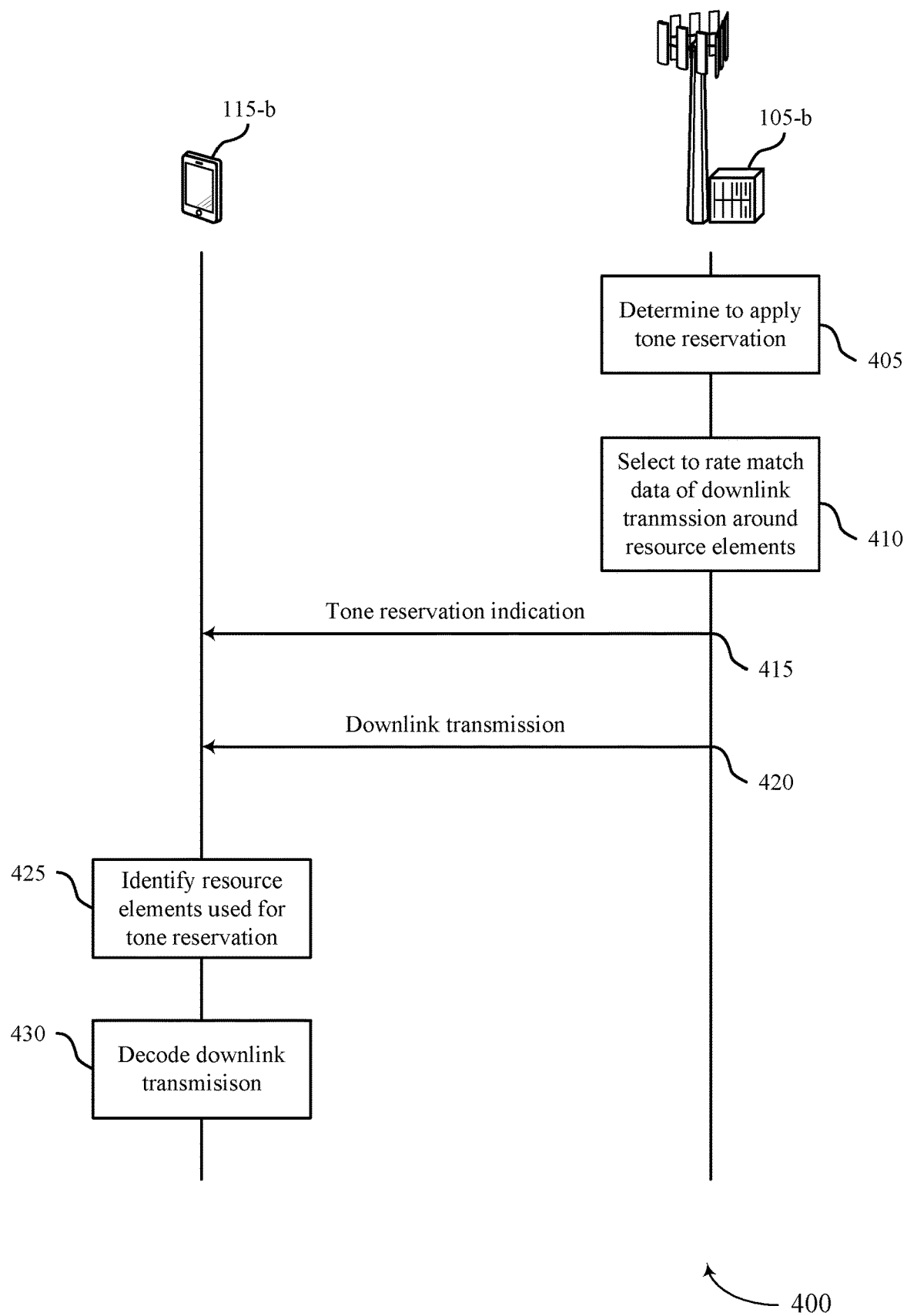
FIG. 4 illustrates an example of a process flow that supports techniques for performing rate matching around resource elements used for tone reservation in accordance with aspects of the present disclosure.

FIG. 4 illustrates an example of a process flow 400 that supports techniques for performing rate matching around resource elements used for tone reservation in accordance with aspects of the present disclosure. The process flow 400 may illustrate an example tone reservation procedure to reducing PAPR. For example, base station 105-b may apply tone reservation to one or more downlink transmissions based on a channel between base station 105-b and the receiving UE 115. Base station 105-b and UE 115-b may be examples of the corresponding wireless devices described with reference to FIGS. 1 through 3. In some cases, instead of base station 105-b implementing the tone reservation procedure, a different type of wireless device (e.g., a UE 115) may perform the procedure. Alternative examples of the following may be implemented, where some steps are performed in a different order than described or are not performed at all. In some cases, steps may include additional features not mentioned below, or further steps may be added.

At 405, base station 105-b may determine to apply tone reservation to a downlink transmission from base station 105-b to UE 115-b. In some cases, base station 105-b may determine an estimation of a channel between base station 105-b and UE 115-b, and select resource elements of the downlink transmission to use for tone reservation based on the estimation of the channel. In some cases, base station 105-b may receive one or more SRSs from UE 115-b, and perform one or more measurements on the one or more SRSs to determine the estimation of the channel. The estimation of the channel may be based on channel reciprocity of a downlink channel and an uplink channel between base station 105-b and UE 115-b.

In some cases, base station 105-b may determine a condition of a channel between UE 115-b and base station 105-b, the condition including a Doppler spread of the channel, or a SNR of the channel.

Base station 105-b may identify a predetermined number of tone reservations, and select the resource elements associated with lowest energy levels of the channel, where a number of resource elements selected is equal to the predetermined number of tone reservations. Base station 105-b may insert a PAPR reducing signal in the selected resource elements. In some implementations, base station 105-b may determine that a PAPR of the downlink transmission is less than a predetermined threshold. As such, base station 105-b may identify a second number of tone reservations higher than the predetermined number of tone reservations, and select the resource elements associated with the lowest energy levels of the channel, where the number of resource elements selected is equal to the second number of tone reservations. Base station 105-b may insert a PAPR reducing signal in the selected resource elements. A power associated with the PAPR reducing signal in the selected resource elements may be less than or equal to a threshold multiplied by an average power associated with resource elements of the downlink transmission used for data transmission.

At 410, base station 105-b may select to rate match data of the downlink transmission around selected resource elements for the tone reservation instead of puncturing the data of the downlink transmission. In some cases, base station 105-b may determine that the Doppler spread of the channel is below a threshold, where selecting to rate match is based on the Doppler spread being below the threshold. In some cases, base station 105-b may determine that the SNR ratio of the channel is greater than a threshold, where selecting to rate match is based on the SNR ratio being greater than the threshold.

In some cases, base station 105-b may receive a capability message from UE 115-b indicating that UE 115-b supports rate matching around resource elements used for tone reservation. Selecting to rate match may be based on the capability of UE 115-b.

At 415, UE 115-b may receive, from base station 105-b, a message indicating that tone reservation is applied to a downlink transmission via rate matching. In some cases, UE 115-b may receive a value indicating a number of resource elements selected for tone reservation. The value may be a percentage of a total number of resource elements of the downlink transmission. In some cases, UE 115-b may receive DCI message, or MAC-CE message including the message indicating that tone reservation is applied to the downlink transmission via rate matching.

At 420, UE 115-b may receive the downlink transmission including data rate matched around selected resource elements used for tone reservation.

In some cases, UE 115-b may receive one or more DMRSs from base station 105-b, and perform one or more measurements on the one or more DMRSs to determine the estimation of the channel. The estimation of the channel may be based on channel reciprocity of a downlink channel and an uplink channel between base station 105-b and UE 115-b.

At 425, UE 115-b may identify the selected resource elements used for tone reservation based on an estimation of a channel between UE 115-b and base station 105-b. UE 115-b may identify resource elements associated with lowest energy levels of the channel, wherein a number of identified resource elements is equal to the value.

At 430, UE 115-b may decode the data of the downlink transmission via rate matching around the selected resource elements used for tone reservation.

Figure 5:
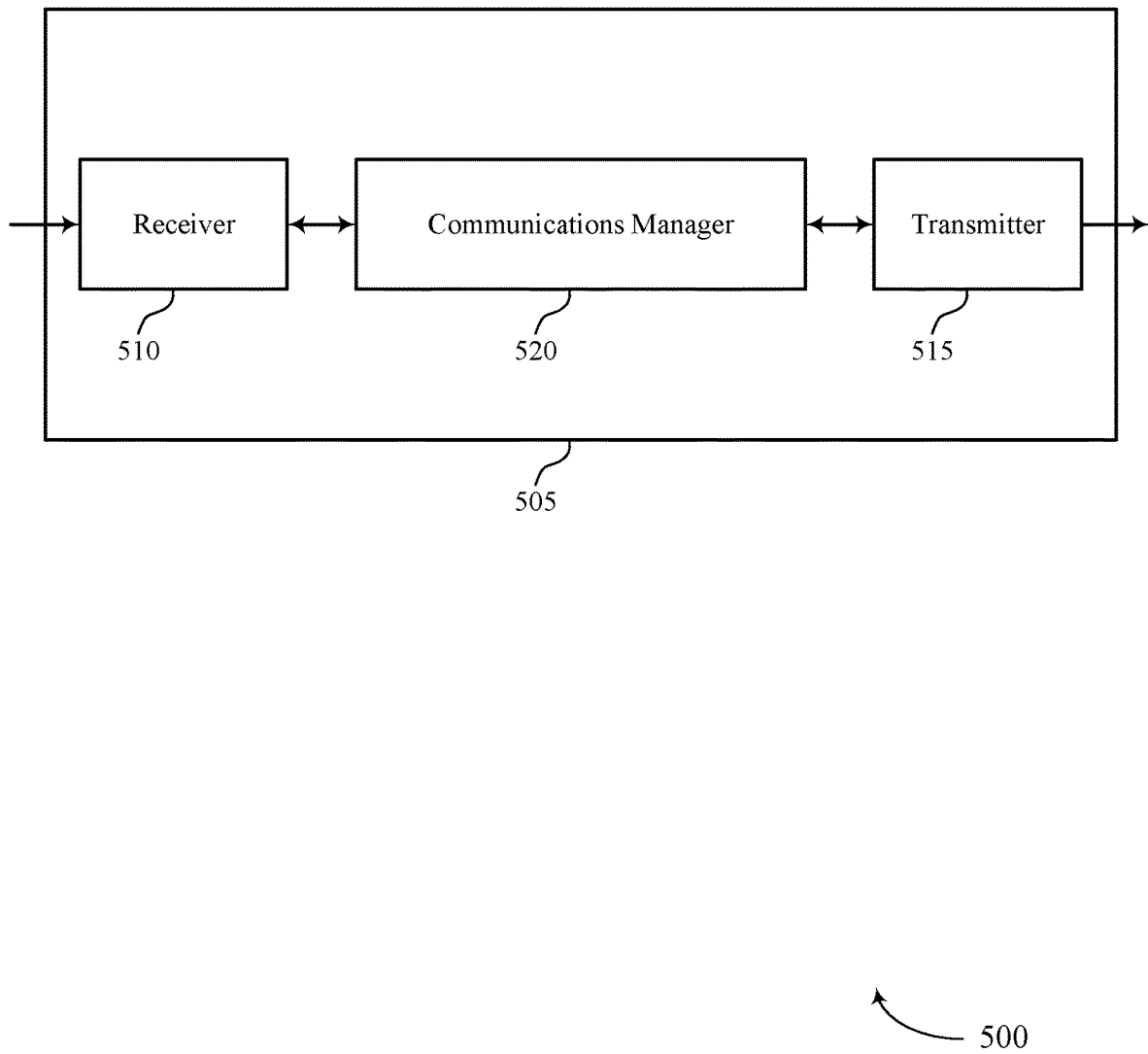
FIGS. 5 and 6 show block diagrams of devices that support techniques for performing rate matching around resource elements used for tone reservation in accordance with aspects of the present disclosure.

FIG. 5 shows a block diagram 500 of a device 505 that supports techniques for performing rate matching around resource elements used for tone reservation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for performing rate matching around resource elements used for tone reservation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for performing rate matching around resource elements used for tone reservation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for performing rate matching around resource elements used for tone reservation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a message indicating that tone reservation is applied to a downlink transmission via rate matching. The communications manager 520 may be configured as or otherwise support a means for receiving the downlink transmission including data rate matched around selected resource elements used for tone reservation. The communications manager 520 may be configured as or otherwise support a means for identifying the selected resource elements used for tone reservation based on an estimation of a channel between the UE and the base station. The communications manager 520 may be configured as or otherwise support a means for decoding the data of the downlink transmission via rate matching around the selected resource elements used for tone reservation.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, and more efficient utilization of communication resources.

Figure 6:
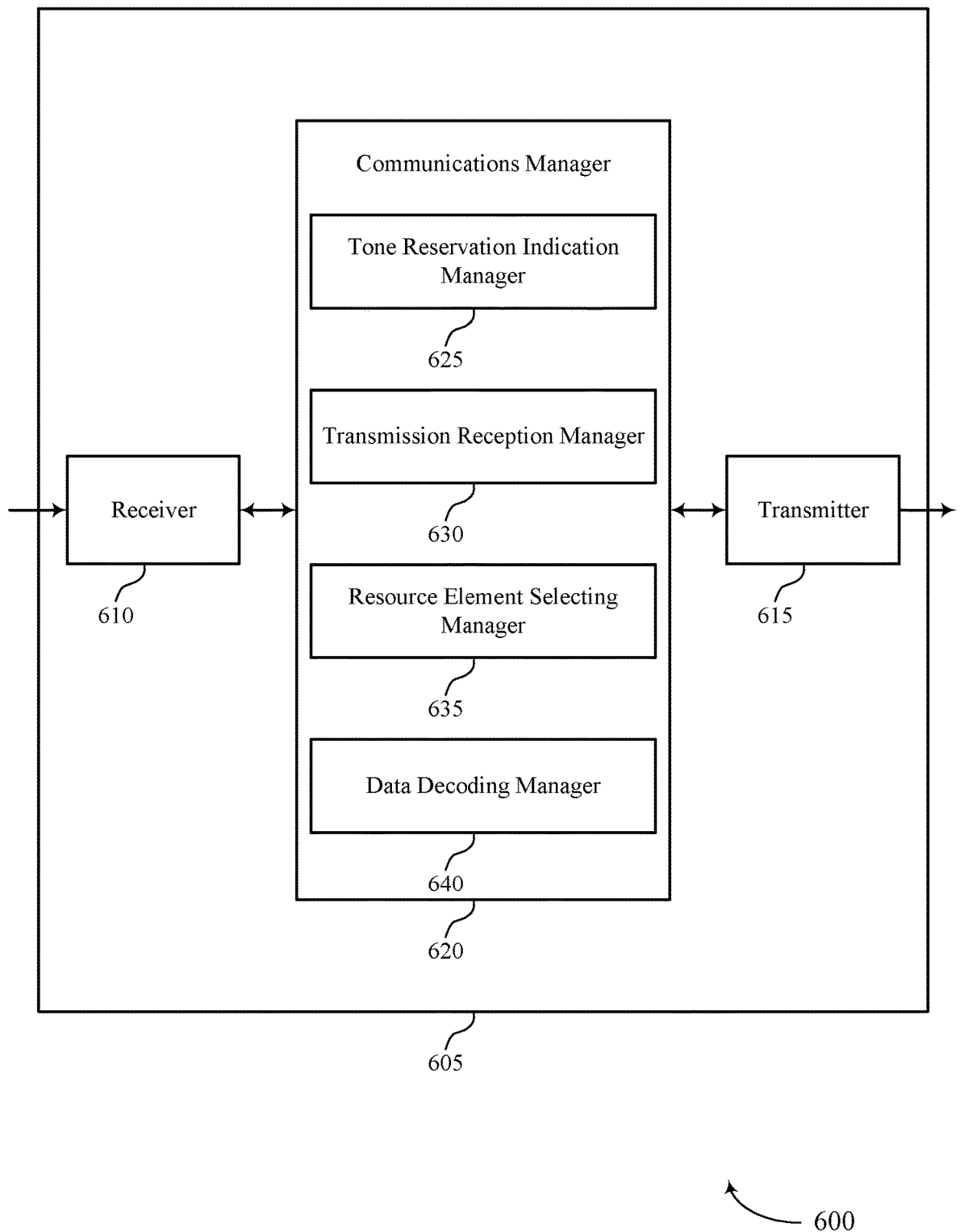

FIG. 6 shows a block diagram 600 of a device 605 that supports techniques for performing rate matching around resource elements used for tone reservation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for performing rate matching around resource elements used for tone reservation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for performing rate matching around resource elements used for tone reservation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for performing rate matching around resource elements used for tone reservation as described herein. For example, the communications manager 620 may include a tone reservation indication manager 625, a transmission reception manager 630, a resource element selecting manager 635, a data decoding manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The tone reservation indication manager 625 may be configured as or otherwise support a means for receiving, from a base station, a message indicating that tone reservation is applied to a downlink transmission via rate matching. The transmission reception manager 630 may be configured as or otherwise support a means for receiving the downlink transmission including data rate matched around selected resource elements used for tone reservation. The resource element selecting manager 635 may be configured as or otherwise support a means for identifying the selected resource elements used for tone reservation based on an estimation of a channel between the UE and the base station. The data decoding manager 640 may be configured as or otherwise support a means for decoding the data of the downlink transmission via rate matching around the selected resource elements used for tone reservation.

Figure 7:
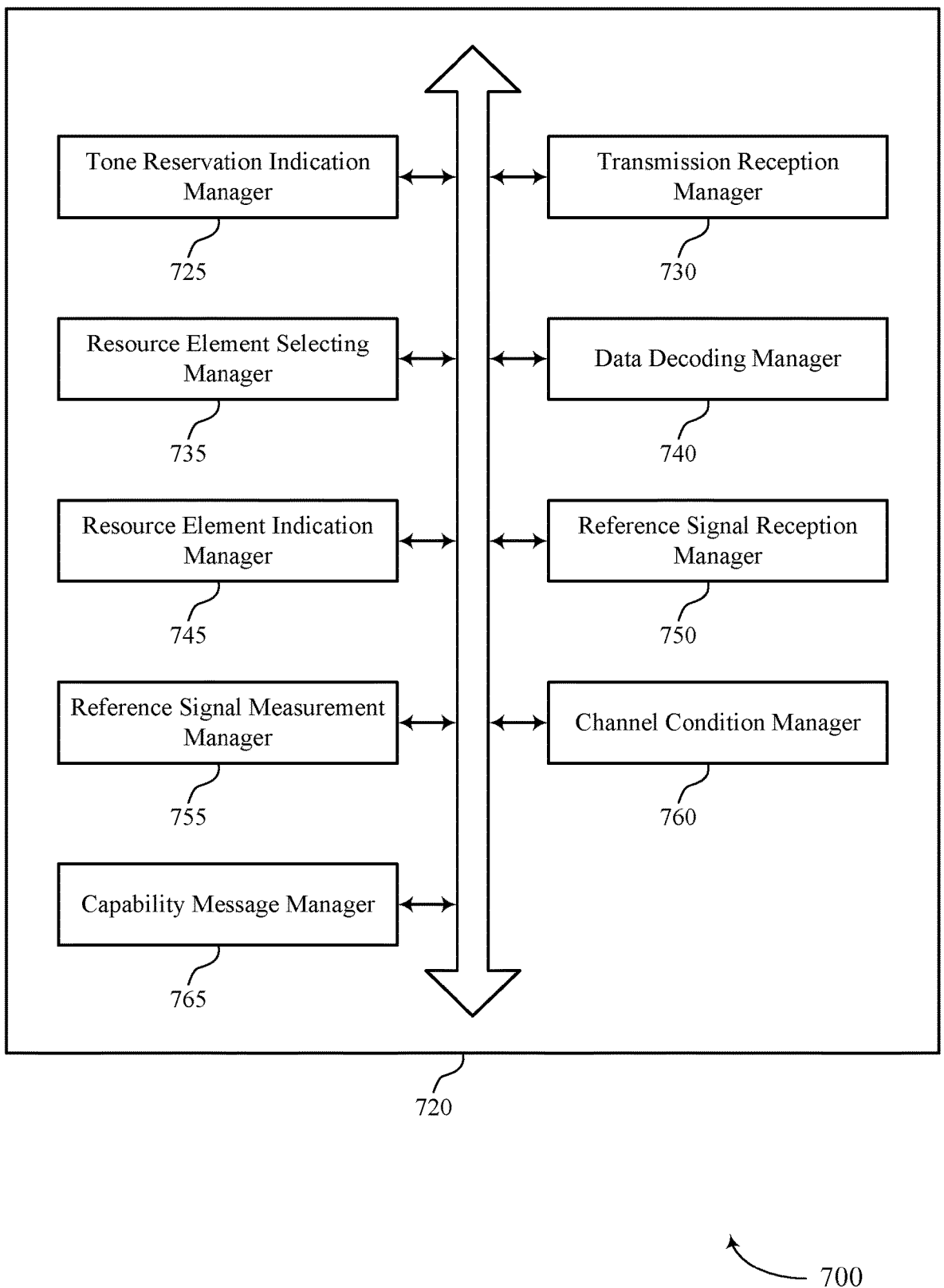
FIG. 7 shows a block diagram of a communications manager that supports techniques for performing rate matching around resource elements used for tone reservation in accordance with aspects of the present disclosure.

FIG. 7 shows a block diagram 700 of a communications manager 720 that supports techniques for performing rate matching around resource elements used for tone reservation in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for performing rate matching around resource elements used for tone reservation as described herein. For example, the communications manager 720 may include a tone reservation indication manager 725, a transmission reception manager 730, a resource element selecting manager 735, a data decoding manager 740, a resource element indication manager 745, a reference signal reception manager 750, a reference signal measurement manager 755, a channel condition manager 760, a capability message manager 765, or any combination thereof. Each of these components may communicate, directly or indirectly, with one another (e.g., via one or more buses).

The communications manager 720 may support wireless communications at a UE in accordance with examples as disclosed herein. The tone reservation indication manager 725 may be configured as or otherwise support a means for receiving, from a base station, a message indicating that tone reservation is applied to a downlink transmission via rate matching. The transmission reception manager 730 may be configured as or otherwise support a means for receiving the downlink transmission including data rate matched around selected resource elements used for tone reservation. The resource element selecting manager 735 may be configured as or otherwise support a means for identifying the selected resource elements used for tone reservation based on an estimation of a channel between the UE and the base station. The data decoding manager 740 may be configured as or otherwise support a means for decoding the data of the downlink transmission via rate matching around the selected resource elements used for tone reservation.

In some examples, the resource element indication manager 745 may be configured as or otherwise support a means for receiving a value indicating a number of resource elements selected for tone reservation.

In some examples, to support identifying the selected resource elements, the resource element selecting manager 735 may be configured as or otherwise support a means for identifying resource elements associated with lowest energy levels of the channel, where a number of identified resource elements is equal to the value.

In some examples, the value is a percentage of a total number of resource elements of the downlink transmission.

In some examples, the reference signal reception manager 750 may be configured as or otherwise support a means for receiving one or more demodulation reference signals from the base station. In some examples, the reference signal measurement manager 755 may be configured as or otherwise support a means for performing one or more measurements on the one or more demodulation reference signals to determine the estimation of the channel.

In some examples, the estimation of the channel is based on channel reciprocity of a downlink channel and an uplink channel between the base station and the UE.

In some examples, the channel condition manager 760 may be configured as or otherwise support a means for determining that Doppler spread, or signal-to-noise ratio, or both are to be used for determining a condition of the channel. In some examples, the channel condition manager 760 may be configured as or otherwise support a means for transmitting an indication for the base station to use Doppler spread, or signal-to-noise ratio, or both for determining the condition of the channel.

In some examples, rate matching is used based on the Doppler spread of the channel being below a first threshold and the signal-to-noise ratio of the channel being greater than a second threshold.

In some examples, the capability message manager 765 may be configured as or otherwise support a means for transmitting a capability message indicating that the UE supports rate matching around resource elements used for tone reservation.

In some examples, a power associated with a PAPR reducing signal in the selected resource elements is less than or equal to a threshold multiplied by an average power associated with resource elements of the downlink transmission used for data transmission.

In some examples, to support receiving the message indicating that tone reservation is applied to the downlink transmission via rate matching, the tone reservation indication manager 725 may be configured as or otherwise support a means for receiving a DCI message or MAC-CE message including the message indicating that tone reservation is applied to the downlink transmission via rate matching.

Figure 8:
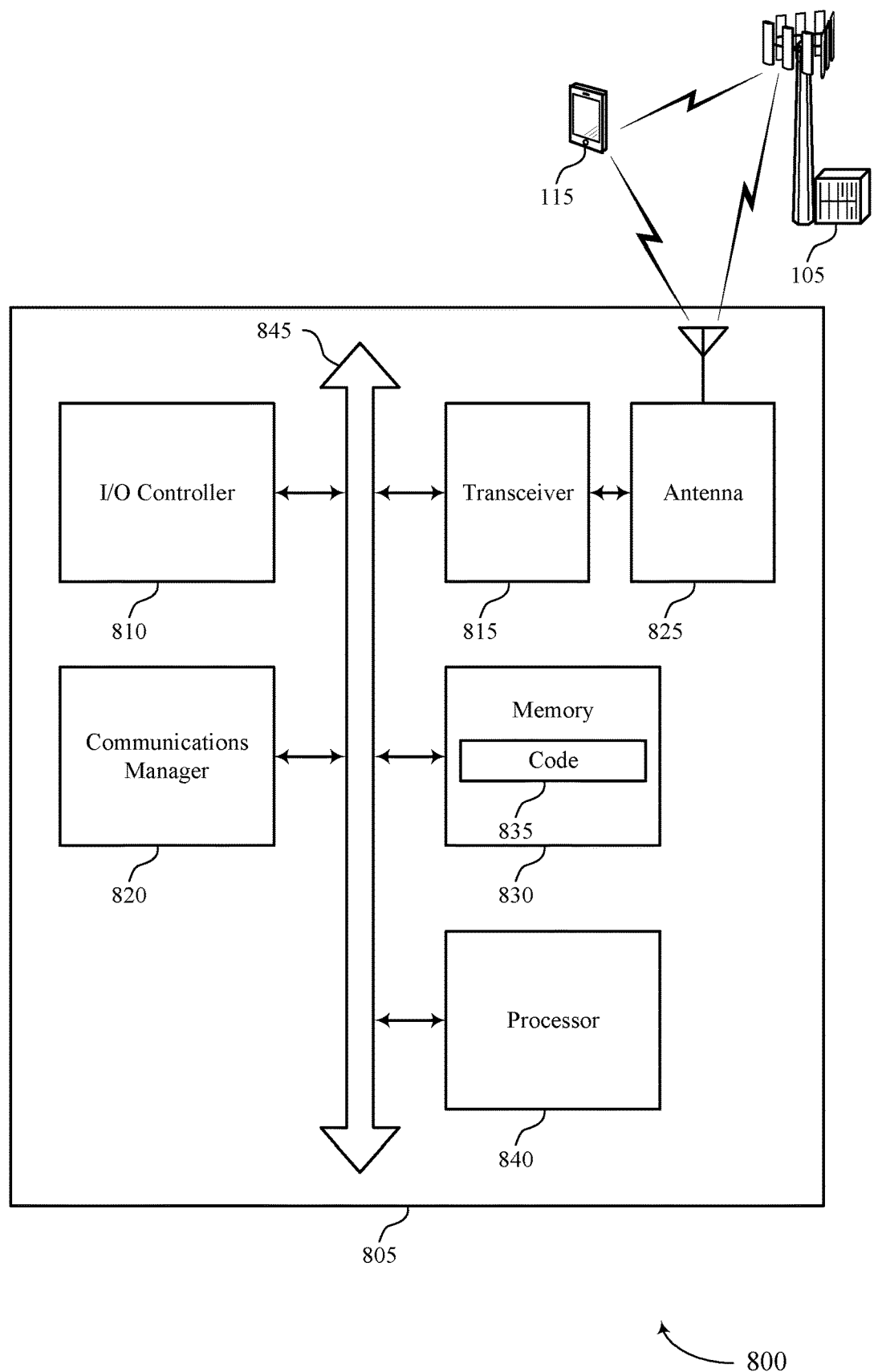
FIG. 8 shows a diagram of a system including a device that supports techniques for performing rate matching around resource elements used for tone reservation in accordance with aspects of the present disclosure.

FIG. 8 shows a diagram of a system 800 including a device 805 that supports techniques for performing rate matching around resource elements used for tone reservation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for performing rate matching around resource elements used for tone reservation). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a message indicating that tone reservation is applied to a downlink transmission via rate matching. The communications manager 820 may be configured as or otherwise support a means for receiving the downlink transmission including data rate matched around selected resource elements used for tone reservation. The communications manager 820 may be configured as or otherwise support a means for identifying the selected resource elements used for tone reservation based on an estimation of a channel between the UE and the base station. The communications manager 820 may be configured as or otherwise support a means for decoding the data of the downlink transmission via rate matching around the selected resource elements used for tone reservation.

By including or configuring the communications manager 820 in accordance with examples as described herein, the device 805 may support techniques for improved user experience related to reduced processing, reduced power consumption, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for performing rate matching around resource elements used for tone reservation as described herein, or the processor 840 and the memory 830 may be otherwise configured to perform or support such operations.

Figure 9:
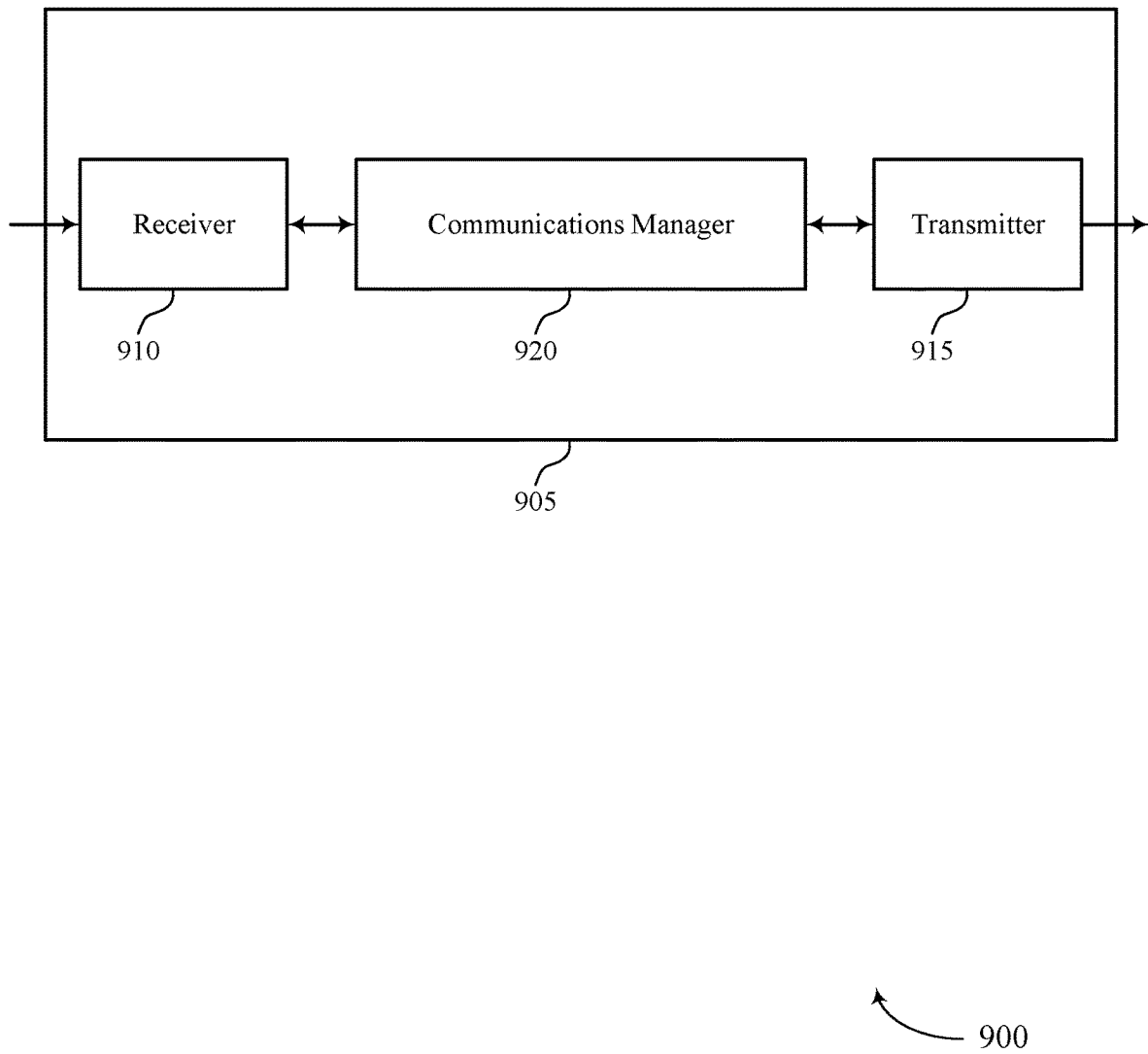
FIGS. 9 and 10 show block diagrams of devices that support techniques for performing rate matching around resource elements used for tone reservation in accordance with aspects of the present disclosure.

FIG. 9 shows a block diagram 900 of a device 905 that supports techniques for performing rate matching around resource elements used for tone reservation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for performing rate matching around resource elements used for tone reservation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for performing rate matching around resource elements used for tone reservation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for performing rate matching around resource elements used for tone reservation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for determining to apply tone reservation to a downlink transmission from the base station to a UE. The communications manager 920 may be configured as or otherwise support a means for selecting to rate match data of the downlink transmission around selected resource elements for the tone reservation instead of puncturing the data of the downlink transmission. The communications manager 920 may be configured as or otherwise support a means for transmitting, to the UE, a message indicating that tone reservation is applied to the downlink transmission via rate matching. The communications manager 920 may be configured as or otherwise support a means for transmitting the downlink transmission including the data rate matched around the selected resource elements used for tone reservation.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, and more efficient utilization of communication resources.

Figure 10:
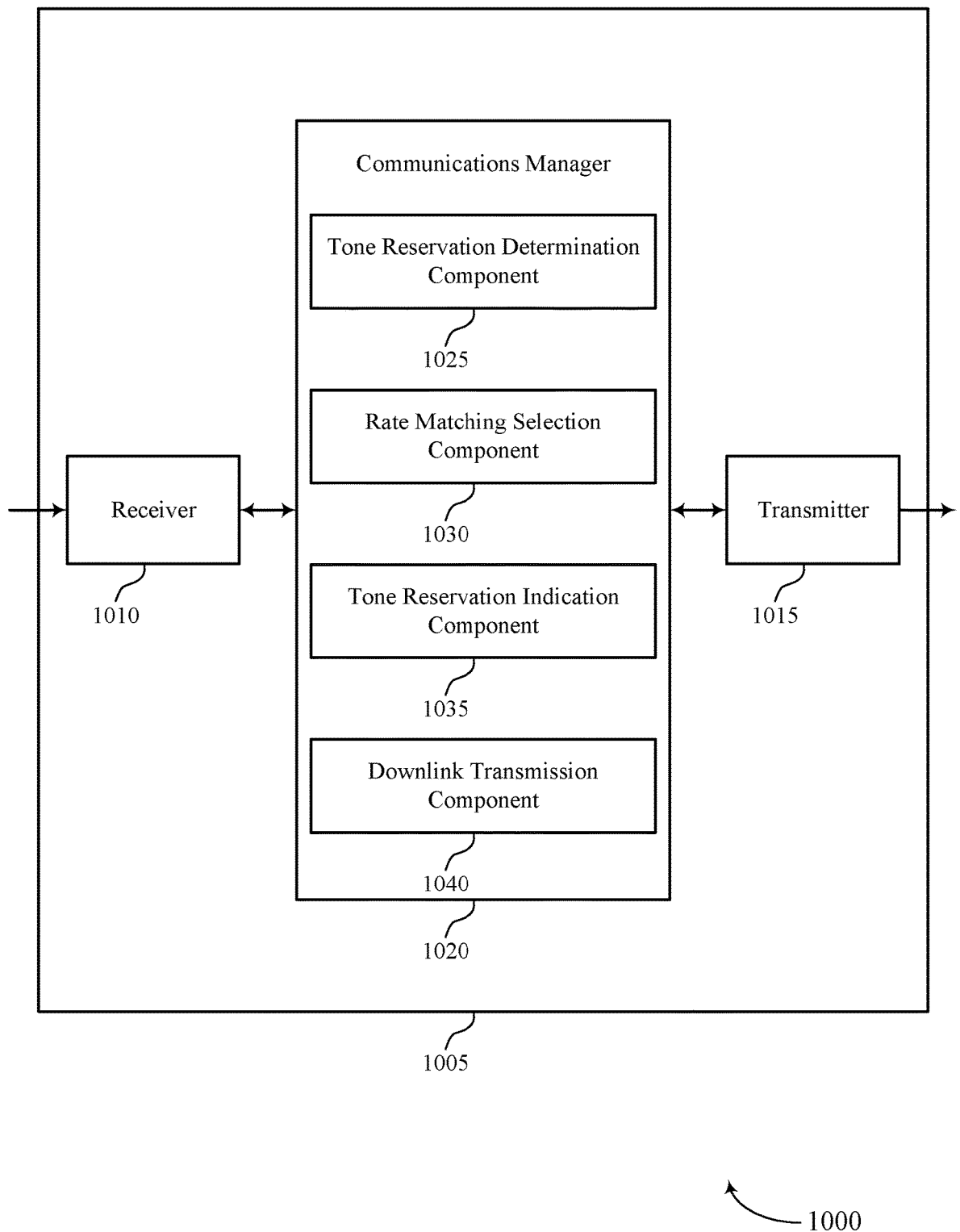

FIG. 10 shows a block diagram 1000 of a device 1005 that supports techniques for performing rate matching around resource elements used for tone reservation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for performing rate matching around resource elements used for tone reservation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for performing rate matching around resource elements used for tone reservation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for performing rate matching around resource elements used for tone reservation as described herein. For example, the communications manager 1020 may include a tone reservation determination component 1025, a rate matching selection component 1030, a tone reservation indication component 1035, a downlink transmission component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The tone reservation determination component 1025 may be configured as or otherwise support a means for determining to apply tone reservation to a downlink transmission from the base station to a UE. The rate matching selection component 1030 may be configured as or otherwise support a means for selecting to rate match data of the downlink transmission around selected resource elements for the tone reservation instead of puncturing the data of the downlink transmission. The tone reservation indication component 1035 may be configured as or otherwise support a means for transmitting, to the UE, a message indicating that tone reservation is applied to the downlink transmission via rate matching. The downlink transmission component 1040 may be configured as or otherwise support a means for transmitting the downlink transmission including the data rate matched around the selected resource elements used for tone reservation.

Figure 11:
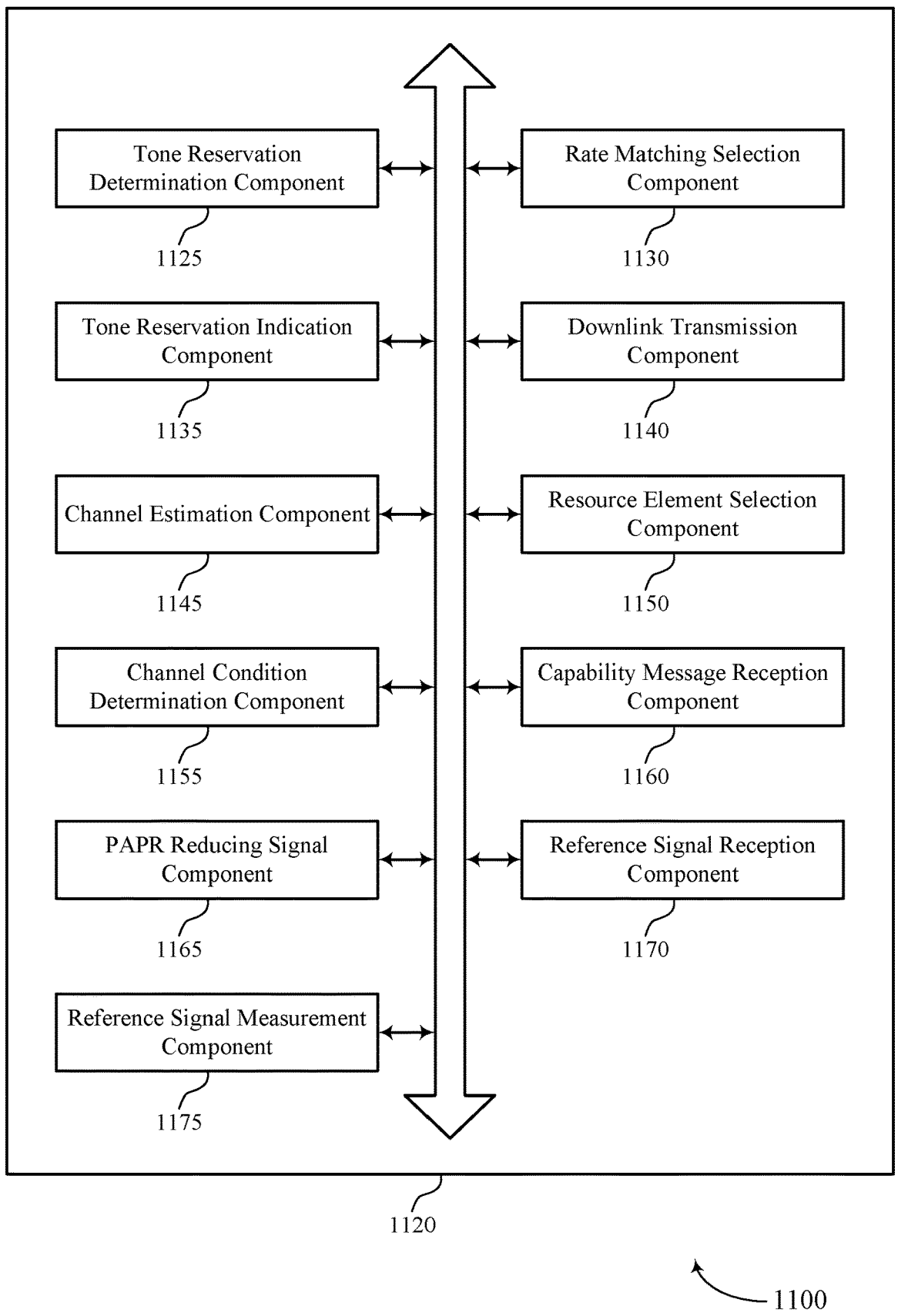
FIG. 11 shows a block diagram of a communications manager that supports techniques for performing rate matching around resource elements used for tone reservation in accordance with aspects of the present disclosure.

FIG. 11 shows a block diagram 1100 of a communications manager 1120 that supports techniques for performing rate matching around resource elements used for tone reservation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for performing rate matching around resource elements used for tone reservation as described herein. For example, the communications manager 1120 may include a tone reservation determination component 1125, a rate matching selection component 1130, a tone reservation indication component 1135, a downlink transmission component 1140, a channel estimation component 1145, a resource element selection component 1150, a channel condition determination component 1155, a capability message reception component 1160, a PAPR reducing signal component 1165, a reference signal reception component 1170, a reference signal measurement component 1175, or any combination thereof. Each of these components may communicate, directly or indirectly, with one another (e.g., via one or more buses).

The communications manager 1120 may support wireless communications at a base station in accordance with examples as disclosed herein. The tone reservation determination component 1125 may be configured as or otherwise support a means for determining to apply tone reservation to a downlink transmission from the base station to a UE. The rate matching selection component 1130 may be configured as or otherwise support a means for selecting to rate match data of the downlink transmission around selected resource elements for the tone reservation instead of puncturing the data of the downlink transmission. The tone reservation indication component 1135 may be configured as or otherwise support a means for transmitting, to the UE, a message indicating that tone reservation is applied to the downlink transmission via rate matching. The downlink transmission component 1140 may be configured as or otherwise support a means for transmitting the downlink transmission including the data rate matched around the selected resource elements used for tone reservation.

In some examples, the channel estimation component 1145 may be configured as or otherwise support a means for determining an estimation of a channel between the base station and the UE. In some examples, the resource element selection component 1150 may be configured as or otherwise support a means for selecting resource elements of the downlink transmission to use for tone reservation based on the estimation of the channel.

In some examples, to support selecting the resource elements, the resource element selection component 1150 may be configured as or otherwise support a means for identifying a predetermined number of tone reservations. In some examples, to support selecting the resource elements, the resource element selection component 1150 may be configured as or otherwise support a means for selecting the resource elements associated with lowest energy levels of the channel, where a number of resource elements selected is equal to the predetermined number of tone reservations. In some examples, to support selecting the resource elements, the PAPR reducing signal component 1165 may be configured as or otherwise support a means for inserting a PAPR reducing signal in the selected resource elements.

In some examples, the PAPR reducing signal component 1165 may be configured as or otherwise support a means for determining that a PAPR of the downlink transmission is less than a predetermined threshold. In some examples, the resource element selection component 1150 may be configured as or otherwise support a means for identifying a second number of tone reservations higher than the predetermined number of tone reservations. In some examples, the resource element selection component 1150 may be configured as or otherwise support a means for selecting the resource elements associated with the lowest energy levels of the channel, where the number of resource elements selected is equal to the second number of tone reservations. In some examples, the PAPR reducing signal component 1165 may be configured as or otherwise support a means for inserting a PAPR reducing signal in the selected resource elements.

In some examples, the reference signal reception component 1170 may be configured as or otherwise support a means for receiving one or more sounding reference signals from the UE. In some examples, the reference signal measurement component 1175 may be configured as or otherwise support a means for performing one or more measurements on the one or more sounding reference signals to determine the estimation of the channel.

In some examples, the estimation of the channel is based on channel reciprocity of a downlink channel and an uplink channel between the base station and the UE.

In some examples, the channel condition determination component 1155 may be configured as or otherwise support a means for determining a condition of a channel between the UE and the base station, the condition including a Doppler spread of the channel, or a signal-to-noise ratio of the channel.

In some examples, the channel condition determination component 1155 may be configured as or otherwise support a means for determining that the Doppler spread of the channel is below a threshold, where selecting to rate match is based on the Doppler spread being below the threshold.

In some examples, the channel condition determination component 1155 may be configured as or otherwise support a means for determining that the signal-to-noise ratio of the channel is greater than a threshold, where selecting to rate match is based on the signal-to-noise ratio being greater than the threshold.

In some examples, the channel condition determination component 1155 may be configured as or otherwise support a means for receiving, from the UE, an indication of the signal-to-noise ratio associated with the channel.

In some examples, the channel condition determination component 1155 may be configured as or otherwise support a means for receiving, from the UE, an indication for the base station to use doppler spread, or signal-to-noise ratio, or both for determining to select rate matching or puncturing.

In some examples, the tone reservation indication component 1135 may be configured as or otherwise support a means for transmitting a value associated with a number of resource elements selected for tone reservation.

In some examples, the value is a percentage of a total number of resource elements of the downlink transmission.

In some examples, the capability message reception component 1160 may be configured as or otherwise support a means for receiving a capability message from the UE indicating that the UE supports rate matching around resource elements used for tone reservation.

In some examples, a power associated with a PAPR reducing signal in the selected resource elements is less than or equal to a threshold multiplied by an average power associated with resource elements of the downlink transmission used for data transmission.

In some examples, to support transmitting the message indicating that tone reservation is applied to the downlink transmission via rate matching, the tone reservation indication component 1135 may be configured as or otherwise support a means for transmitting a radio resource control message, a DCI message or MAC-CE message including the message indicating that tone reservation is applied to the downlink transmission via rate matching.

Figure 12:
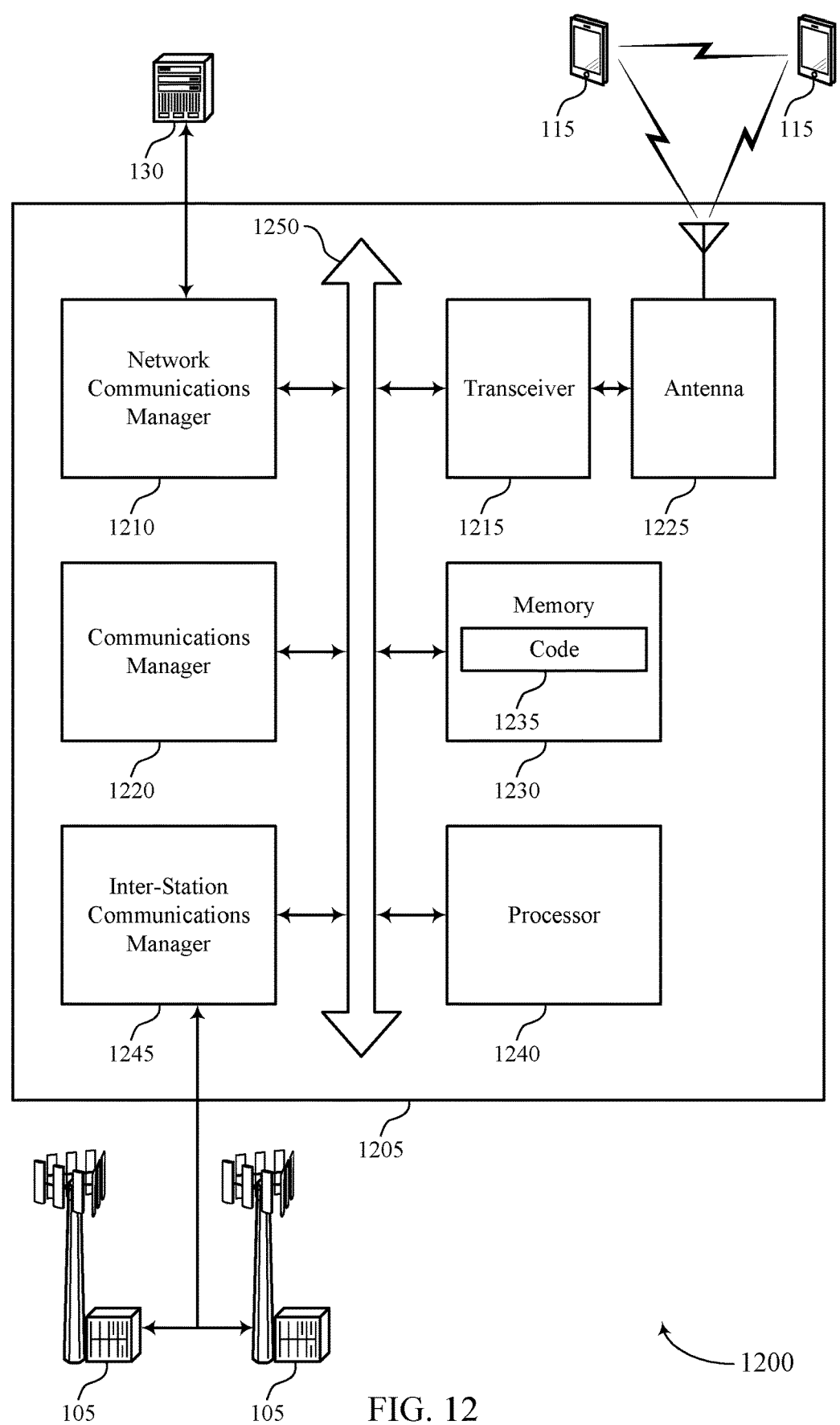
FIG. 12 shows a diagram of a system including a device that supports techniques for performing rate matching around resource elements used for tone reservation in accordance with aspects of the present disclosure.

FIG. 12 shows a diagram of a system 1200 including a device 1205 that supports techniques for performing rate matching around resource elements used for tone reservation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for performing rate matching around resource elements used for tone reservation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for determining to apply tone reservation to a downlink transmission from the base station to a UE. The communications manager 1220 may be configured as or otherwise support a means for selecting to rate match data of the downlink transmission around selected resource elements for the tone reservation instead of puncturing the data of the downlink transmission. The communications manager 1220 may be configured as or otherwise support a means for transmitting, to the UE, a message indicating that tone reservation is applied to the downlink transmission via rate matching. The communications manager 1220 may be configured as or otherwise support a means for transmitting the downlink transmission including the data rate matched around the selected resource elements used for tone reservation.

By including or configuring the communications manager 1220 in accordance with examples as described herein, the device 1205 may support techniques for improved user experience related to reduced processing, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for performing rate matching around resource elements used for tone reservation as described herein, or the processor 1240 and the memory 1230 may be otherwise configured to perform or support such operations.

Figure 13:
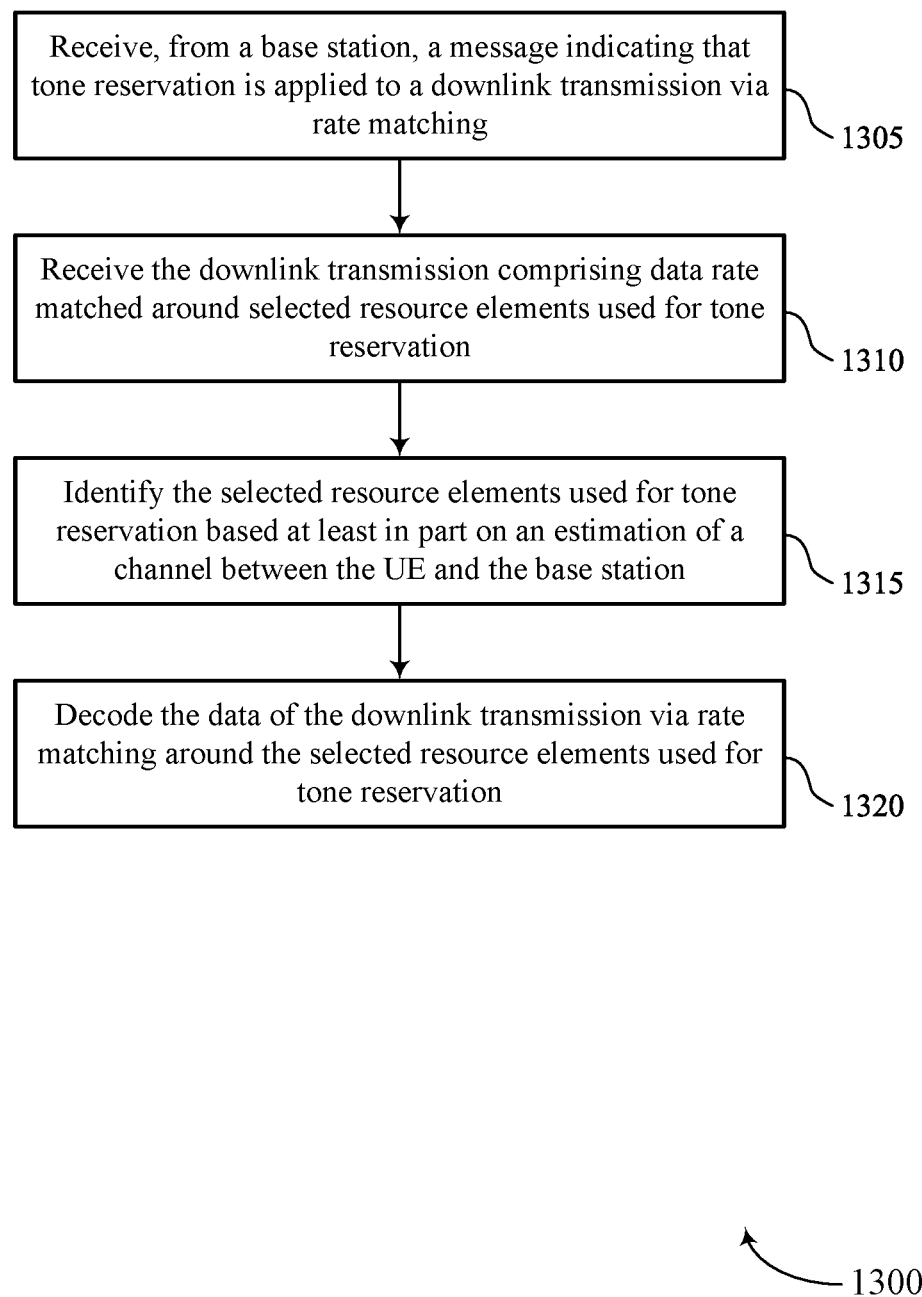
FIGS. 13 through 16 show flowcharts illustrating methods that support techniques for performing rate matching around resource elements used for tone reservation in accordance with aspects of the present disclosure.

FIG. 13 shows a flowchart illustrating a method 1300 that supports techniques for performing rate matching around resource elements used for tone reservation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a message indicating that tone reservation is applied to a downlink transmission via rate matching. The operations of 1305 may be performed in accordance with examples as disclosed herein. In some examples, aspects of the operations of 1305 may be performed by a tone reservation indication manager 725 as described with reference to FIG. 7.

At 1310, the method may include receiving the downlink transmission including data rate matched around selected resource elements used for tone reservation. The operations of 1310 may be performed in accordance with examples as disclosed herein. In some examples, aspects of the operations of 1310 may be performed by a transmission reception manager 730 as described with reference to FIG. 7.

At 1315, the method may include identifying the selected resource elements used for tone reservation based on an estimation of a channel between the UE and the base station. The operations of 1315 may be performed in accordance with examples as disclosed herein. In some examples, aspects of the operations of 1315 may be performed by a resource element selecting manager 735 as described with reference to FIG. 7.

At 1320, the method may include decoding the data of the downlink transmission via rate matching around the selected resource elements used for tone reservation. The operations of 1320 may be performed in accordance with examples as disclosed herein. In some examples, aspects of the operations of 1320 may be performed by a data decoding manager 740 as described with reference to FIG. 7.

Figure 14:
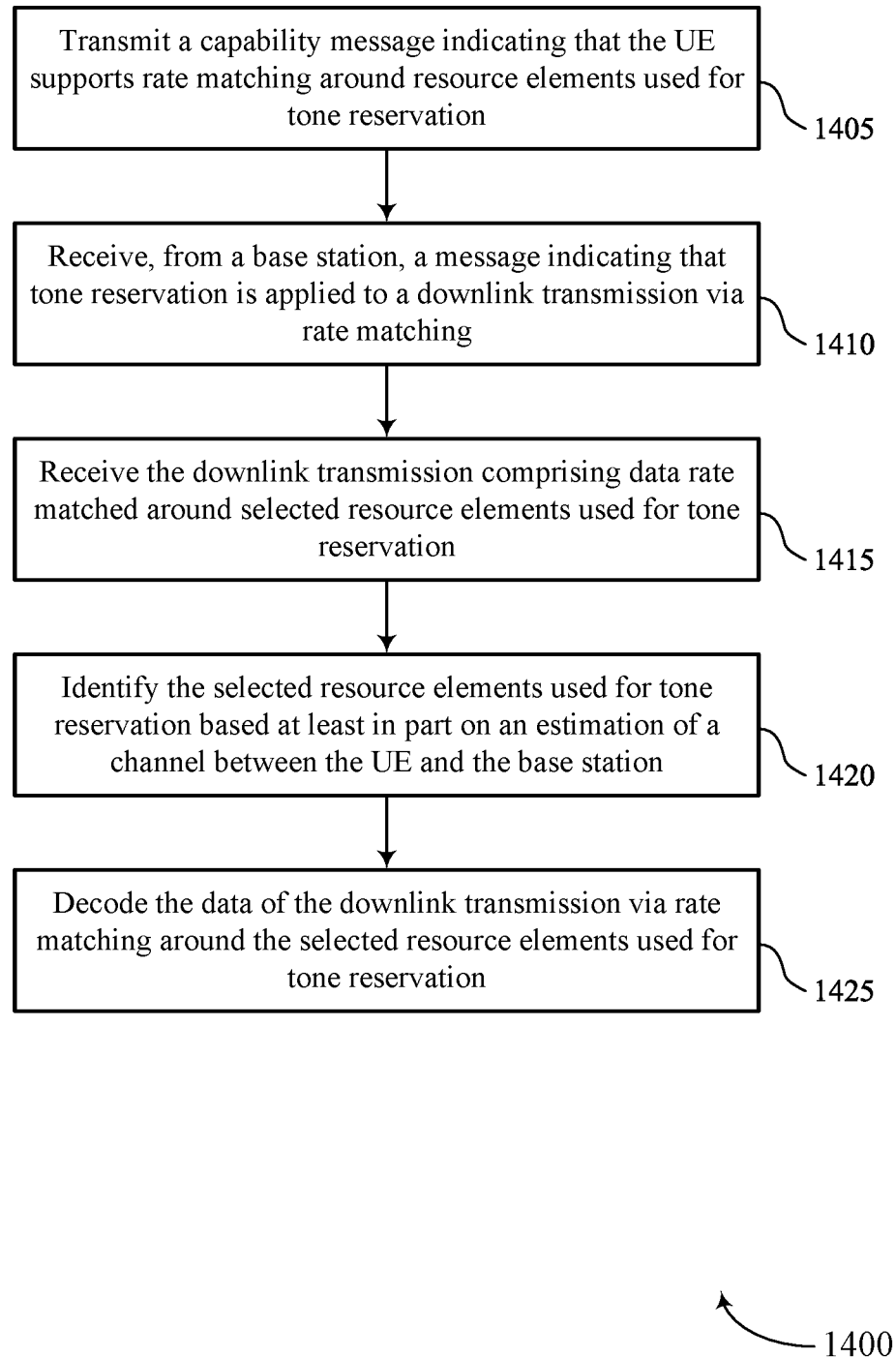

FIG. 14 shows a flowchart illustrating a method 1400 that supports techniques for performing rate matching around resource elements used for tone reservation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting a capability message indicating that the UE supports rate matching around resource elements used for tone reservation. The operations of 1405 may be performed in accordance with examples as disclosed herein. In some examples, aspects of the operations of 1405 may be performed by a capability message manager 765 as described with reference to FIG. 7.

At 1410, the method may include receiving, from a base station, a message indicating that tone reservation is applied to a downlink transmission via rate matching. The operations of 1410 may be performed in accordance with examples as disclosed herein. In some examples, aspects of the operations of 1410 may be performed by a tone reservation indication manager 725 as described with reference to FIG. 7.

At 1415, the method may include receiving the downlink transmission including data rate matched around selected resource elements used for tone reservation. The operations of 1415 may be performed in accordance with examples as disclosed herein. In some examples, aspects of the operations of 1415 may be performed by a transmission reception manager 730 as described with reference to FIG. 7.

At 1420, the method may include identifying the selected resource elements used for tone reservation based on an estimation of a channel between the UE and the base station. The operations of 1420 may be performed in accordance with examples as disclosed herein. In some examples, aspects of the operations of 1420 may be performed by a resource element selecting manager 735 as described with reference to FIG. 7.

At 1425, the method may include decoding the data of the downlink transmission via rate matching around the selected resource elements used for tone reservation. The operations of 1425 may be performed in accordance with examples as disclosed herein. In some examples, aspects of the operations of 1425 may be performed by a data decoding manager 740 as described with reference to FIG. 7.

Figure 15:
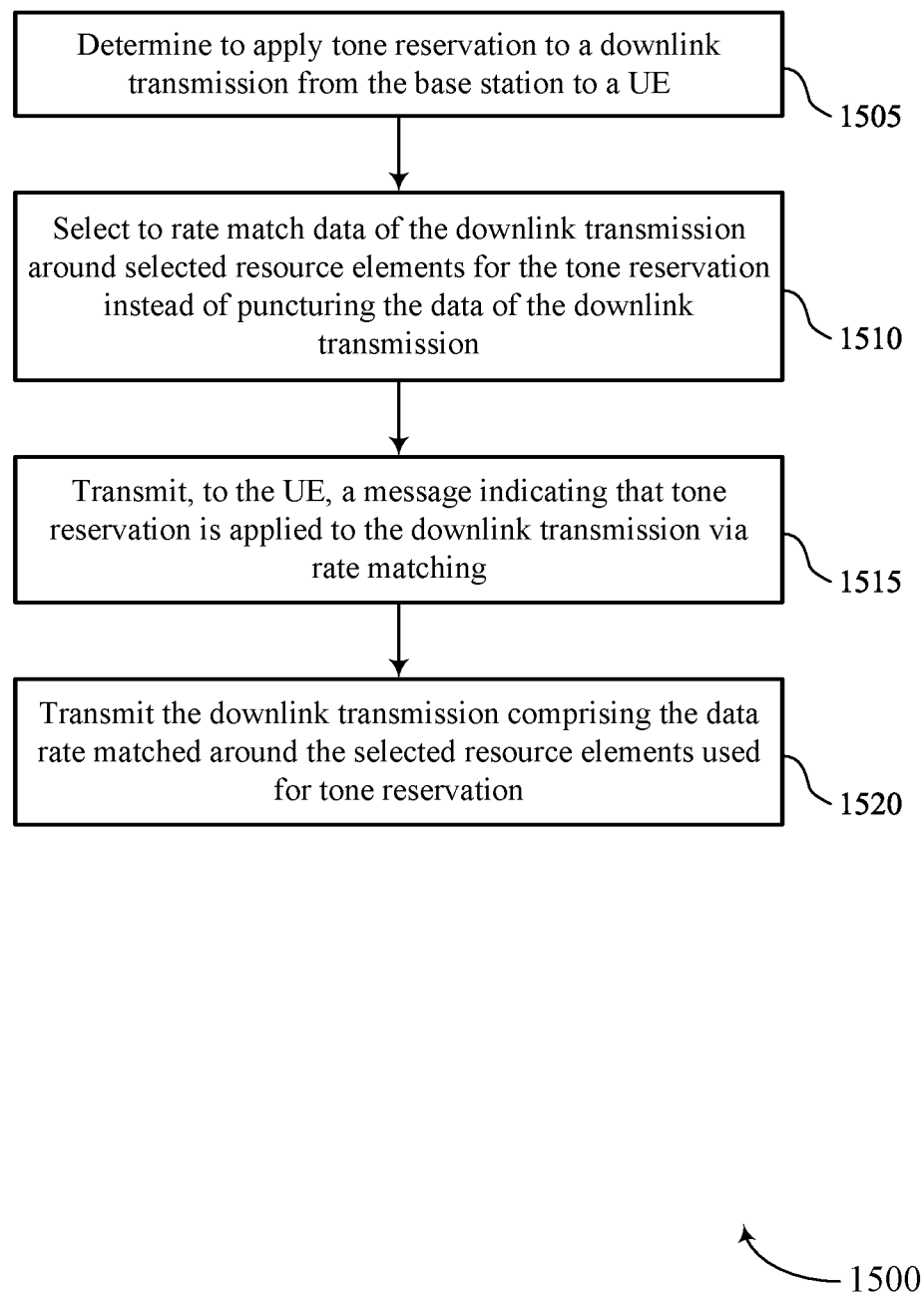

FIG. 15 shows a flowchart illustrating a method 1500 that supports techniques for performing rate matching around resource elements used for tone reservation in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include determining to apply tone reservation to a downlink transmission from the base station to a UE. The operations of 1505 may be performed in accordance with examples as disclosed herein. In some examples, aspects of the operations of 1505 may be performed by a tone reservation determination component 1125 as described with reference to FIG. 11.

At 1510, the method may include selecting to rate match data of the downlink transmission around selected resource elements for the tone reservation instead of puncturing the data of the downlink transmission. The operations of 1510 may be performed in accordance with examples as disclosed herein. In some examples, aspects of the operations of 1510 may be performed by a rate matching selection component 1130 as described with reference to FIG. 11.

At 1515, the method may include transmitting, to the UE, a message indicating that tone reservation is applied to the downlink transmission via rate matching. The operations of 1515 may be performed in accordance with examples as disclosed herein. In some examples, aspects of the operations of 1515 may be performed by a tone reservation indication component 1135 as described with reference to FIG. 11.

At 1520, the method may include transmitting the downlink transmission including the data rate matched around selected resource elements used for tone reservation. The operations of 1520 may be performed in accordance with examples as disclosed herein. In some examples, aspects of the operations of 1520 may be performed by a downlink transmission component 1140 as described with reference to FIG. 11.

Figure 16:
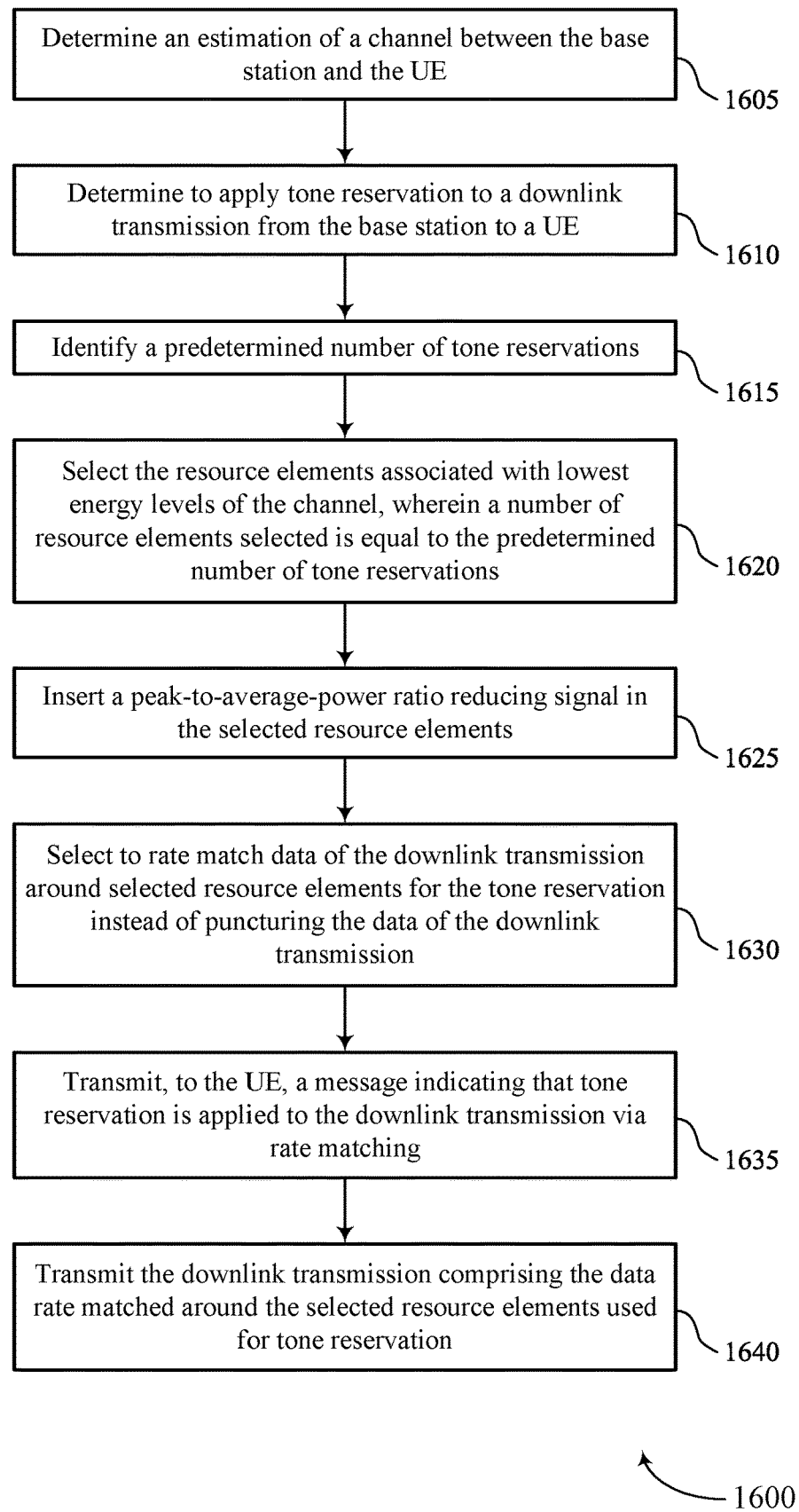

FIG. 16 shows a flowchart illustrating a method 1600 that supports techniques for performing rate matching around resource elements used for tone reservation in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include determining an estimation of a channel between the base station and the UE. The operations of 1605 may be performed in accordance with examples as disclosed herein. In some examples, aspects of the operations of 1605 may be performed by a channel estimation component 1145 as described with reference to FIG. 11.

At 1610, the method may include determining to apply tone reservation to a downlink transmission from the base station to a UE. The operations of 1610 may be performed in accordance with examples as disclosed herein. In some examples, aspects of the operations of 1610 may be performed by a tone reservation determination component 1125 as described with reference to FIG. 11.

At 1615, the method may include identifying a predetermined number of tone reservations. The operations of 1615 may be performed in accordance with examples as disclosed herein. In some examples, aspects of the operations of 1615 may be performed by a resource element selection component 1150 as described with reference to FIG. 11.

At 1620, the method may include selecting the resource elements associated with lowest energy levels of the channel, where a number of resource elements selected is equal to the predetermined number of tone reservations. The operations of 1620 may be performed in accordance with examples as disclosed herein. In some examples, aspects of the operations of 1620 may be performed by a resource element selection component 1150 as described with reference to FIG. 11.

At 1625, the method may include inserting a PAPR reducing signal in the selected resource elements. The operations of 1625 may be performed in accordance with examples as disclosed herein. In some examples, aspects of the operations of 1625 may be performed by a PAPR reducing signal component 1165 as described with reference to FIG. 11.

At 1630, the method may include selecting to rate match data of the downlink transmission around selected resource elements for the tone reservation instead of puncturing the data of the downlink transmission. The operations of 1630 may be performed in accordance with examples as disclosed herein. In some examples, aspects of the operations of 1630 may be performed by a rate matching selection component 1130 as described with reference to FIG. 11.

At 1635, the method may include transmitting, to the UE, a message indicating that tone reservation is applied to the downlink transmission via rate matching. The operations of 1635 may be performed in accordance with examples as disclosed herein. In some examples, aspects of the operations of 1635 may be performed by a tone reservation indication component 1135 as described with reference to FIG. 11.

At 1640, the method may include transmitting the downlink transmission including the data rate matched around the selected resource elements used for tone reservation. The operations of 1640 may be performed in accordance with examples as disclosed herein. In some examples, aspects of the operations of 1640 may be performed by a downlink transmission component 1140 as described with reference to FIG. 11.

The following provides an overview of aspects of the present disclosure:

Aspect 1: A method for wireless communications at a UE, comprising: receiving, from a base station, a message indicating that tone reservation is applied to a downlink transmission via rate matching; receiving the downlink transmission comprising data rate matched around selected resource elements used for tone reservation; identifying the selected resource elements used for tone reservation based at least in part on an estimation of a channel between the UE and the base station; and decoding the data of the downlink transmission via rate matching around the selected resource elements used for tone reservation.

Aspect 2: The method of aspect 1, further comprising: receiving a value indicating a number of resource elements selected for tone reservation.

Aspect 3: The method of aspect 2, wherein identifying the selected resource elements further comprises: identifying resource elements associated with lowest energy levels of the channel, wherein a number of identified resource elements is equal to the value.

Aspect 4: The method of any of aspects 2 through 3, wherein the value is a percentage of a total number of resource elements of the downlink transmission.

Aspect 5: The method of any of aspects 1 through 4, further comprising: receiving one or more demodulation reference signals from the base station; and performing one or more measurements on the one or more demodulation reference signals to determine the estimation of the channel.

Aspect 6: The method of any of aspects 1 through 5, wherein the estimation of the channel is based at least in part on channel reciprocity of a downlink channel and an uplink channel between the base station and the UE.

Aspect 7: The method of any of aspects 1 through 6, further comprising: determining that Doppler spread, or signal-to-noise ratio, or both are to be used for determining a condition of the channel; and transmitting an indication for the base station to use Doppler spread, or signal-to-noise ratio, or both for determining the condition of the channel.

Aspect 8: The method of aspect 7, wherein rate matching is used based at least in part on the Doppler spread of the channel being below a first threshold and the signal-to-noise ratio of the channel being greater than a second threshold.

Aspect 9: The method of any of aspects 1 through 8, further comprising: transmitting a capability message indicating that the UE supports rate matching around resource elements used for tone reservation.

Aspect 10: The method of any of aspects 1 through 9, wherein a power associated with a peak-to-average-power ratio reducing signal in the selected resource elements is less than or equal to a threshold multiplied by an average power associated with resource elements of the downlink transmission used for data transmission.

Aspect 11: The method of any of aspects 1 through 10, wherein receiving the message indicating that tone reservation is applied to the downlink transmission via rate matching further comprises: receiving a downlink control information message or medium access control (MAC) control element (CE) message comprising the message indicating that tone reservation is applied to the downlink transmission via rate matching.

Aspect 12: A method for wireless communications at a base station, comprising: determining to apply tone reservation to a downlink transmission from the base station to a UE; selecting to rate match data of the downlink transmission around selected resource elements for the tone reservation instead of puncturing the data of the downlink transmission; transmitting, to the UE, a message indicating that tone reservation is applied to the downlink transmission via rate matching; and transmitting the downlink transmission comprising the data rate matched around the selected resource elements used for tone reservation.

Aspect 13: The method of aspect 12, further comprising: determining an estimation of a channel between the base station and the UE; and selecting resource elements of the downlink transmission to use for tone reservation based at least in part on the estimation of the channel.

Aspect 14: The method of aspect 13, wherein selecting the resource elements further comprises: identifying a predetermined number of tone reservations; selecting the resource elements associated with lowest energy levels of the channel, wherein a number of resource elements selected is equal to the predetermined number of tone reservations; and inserting a peak-to-average-power ratio reducing signal in the selected resource elements.

Aspect 15: The method of aspect 14, further comprising: determining that a peak-to-average-power ratio of the downlink transmission is less than a predetermined threshold; identifying a second number of tone reservations higher than the predetermined number of tone reservations; selecting the resource elements associated with the lowest energy levels of the channel, wherein the number of resource elements selected is equal to the second number of tone reservations; and inserting a peak-to-average-power ratio reducing signal in the selected resource elements.

Aspect 16: The method of any of aspects 13 through 15, further comprising: receiving one or more sounding reference signals from the UE; and performing one or more measurements on the one or more sounding reference signals to determine the estimation of the channel.

Aspect 17: The method of any of aspects 13 through 16, wherein the estimation of the channel is based at least in part on channel reciprocity of a downlink channel and an uplink channel between the base station and the UE.

Aspect 18: The method of any of aspects 12 through 17, further comprising: determining a condition of a channel between the UE and the base station, the condition comprising a Doppler spread of the channel, or a signal-to-noise ratio of the channel.

Aspect 19: The method of aspect 18, further comprising: determining that the Doppler spread of the channel is below a threshold, wherein selecting to rate match is based at least in part on the Doppler spread being below the threshold.

Aspect 20: The method of any of aspects 18 through 19, further comprising: determining that the signal-to-noise ratio of the channel is greater than a threshold, wherein selecting to rate match is based at least in part on the signal-to-noise ratio being greater than the threshold.

Aspect 21: The method of any of aspects 18 through 20, further comprising: receiving, from the UE, an indication of the signal-to-noise ratio associated with the channel.

Aspect 22: The method of any of aspects 18 through 21, further comprising: receiving, from the UE, an indication for the base station to use doppler spread, or signal-to-noise ratio, or both for determining to select rate matching or puncturing.

Aspect 23: The method of any of aspects 12 through 22, further comprising: transmitting a value associated with a number of resource elements selected for tone reservation.

Aspect 24: The method of aspect 23, wherein the value is a percentage of a total number of resource elements of the downlink transmission.

Aspect 25: The method of any of aspects 12 through 24, further comprising: receiving a capability message from the UE indicating that the UE supports rate matching around resource elements used for tone reservation.

Aspect 26: The method of any of aspects 12 through 25, wherein a power associated with a peak-to-average-power ratio reducing signal in the selected resource elements is less than or equal to a threshold multiplied by an average power associated with resource elements of the downlink transmission used for data transmission.

Aspect 27: The method of any of aspects 12 through 26, wherein transmitting the message indicating that tone reservation is applied to the downlink transmission via rate matching further comprises: transmitting a radio resource control message, a downlink control information message or medium access control (MAC) control element (CE) message comprising the message indicating that tone reservation is applied to the downlink transmission via rate matching.

Aspect 28: An apparatus for wireless communications, comprising a processor; memory coupled with the processor; and instructions stored in the memory and executable by the processor to cause the apparatus to perform a method of any of aspects 1 through 11.

Aspect 29: An apparatus for wireless communications, comprising at least one means for performing a method of any of aspects 1 through 11.

Aspect 30: A non-transitory computer-readable medium storing code for wireless communications at a UE, the code comprising instructions executable by a processor to perform a method of any of aspects 1 through 11.

Aspect 31: An apparatus for wireless communications, comprising a processor; memory coupled with the processor; and instructions stored in the memory and executable by the processor to cause the apparatus to perform a method of any of aspects 12 through 27.

Aspect 32: An apparatus for wireless communications, comprising at least one means for performing a method of any of aspects 12 through 27.

Aspect 33: A non-transitory computer-readable medium storing code for wireless communications at a base station, the code comprising instructions executable by a processor to perform a method of any of aspects 12 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a message indicating that tone reservation is applied to a downlink transmission via rate matching;
   receiving the downlink transmission comprising data rate matched around selected resource elements used for tone reservation;

identifying the selected resource elements used for tone reservation based at least in part on an estimation of a channel between the UE and the base station; and decoding the data of the downlink transmission via rate matching around the selected resource elements used for tone reservation.

2. The method of claim 1, further comprising:
receiving a value indicating a number of resource elements selected for tone reservation.

3. The method of claim 2, wherein identifying the selected resource elements further comprises:
identifying resource elements associated with lowest energy levels of the channel, wherein a number of identified resource elements is equal to the value.

4. The method of claim 2, wherein the value is a percentage of a total number of resource elements of the downlink transmission.

5. The method of claim 1, further comprising:
receiving one or more demodulation reference signals from the base station; and
performing one or more measurements on the one or more demodulation reference signals to determine the estimation of the channel.

6. The method of claim 1, wherein the estimation of the channel is based at least in part on channel reciprocity of a downlink channel and an uplink channel between the base station and the UE.

7. The method of claim 1, further comprising:
determining that Doppler spread, or signal-to-noise ratio, or both are to be used for determining a condition of the channel; and
transmitting an indication for the base station to use Doppler spread, or signal-to-noise ratio, or both for determining the condition of the channel.

8. The method of claim 7, wherein rate matching is used based at least in part on the Doppler spread of the channel being below a first threshold and the signal-to-noise ratio of the channel being greater than a second threshold.

9. The method of claim 1, further comprising:
transmitting a capability message indicating that the UE supports rate matching around resource elements used for tone reservation.

10. The method of claim 1, wherein a power associated with a peak-to-average-power ratio reducing signal in the selected resource elements is less than or equal to a threshold multiplied by an average power associated with resource elements of the downlink transmission used for data transmission.

11. The method of claim 1, wherein receiving the message indicating that tone reservation is applied to the downlink transmission via rate matching further comprises:
receiving a downlink control information message or medium access control (MAC) control element (CE) message comprising the message indicating that tone reservation is applied to the downlink transmission via rate matching.

12. A method for wireless communications at a base station, comprising:
determining to apply tone reservation to a downlink transmission from the base station to a user equipment (UE);
selecting to rate match data of the downlink transmission around selected resource elements for the tone reservation instead of puncturing the data of the downlink transmission;
transmitting, to the UE, a message indicating that tone reservation is applied to the downlink transmission via rate matching; and
transmitting the downlink transmission comprising the data rate matched around the selected resource elements used for tone reservation.

13. The method of claim 12, further comprising:
determining an estimation of a channel between the base station and the UE; and
selecting resource elements of the downlink transmission to use for tone reservation based at least in part on the estimation of the channel.

14. The method of claim 13, wherein selecting the resource elements further comprises:
identifying a predetermined number of tone reservations;
selecting the resource elements associated with lowest energy levels of the channel, wherein a number of resource elements selected is equal to the predetermined number of tone reservations; and
inserting a peak-to-average-power ratio reducing signal in the selected resource elements.

15. The method of claim 14, further comprising:
determining that a peak-to-average-power ratio of the downlink transmission is less than a predetermined threshold;
identifying a second number of tone reservations higher than the predetermined number of tone reservations;
selecting the resource elements associated with the lowest energy levels of the channel, wherein the number of resource elements selected is equal to the second number of tone reservations; and
inserting a peak-to-average-power ratio reducing signal in the selected resource elements.

16. The method of claim 13, further comprising:
receiving one or more sounding reference signals from the UE; and
performing one or more measurements on the one or more sounding reference signals to determine the estimation of the channel.

17. The method of claim 13, wherein the estimation of the channel is based at least in part on channel reciprocity of a downlink channel and an uplink channel between the base station and the UE.

18. The method of claim 12, further comprising:
determining a condition of a channel between the UE and the base station, the condition comprising a Doppler spread of the channel, or a signal-to-noise ratio of the channel.

19. The method of claim 18, further comprising:
determining that the Doppler spread of the channel is below a threshold, wherein selecting to rate match is based at least in part on the Doppler spread being below the threshold.

20. The method of claim 18, further comprising:
determining that the signal-to-noise ratio of the channel is greater than a threshold, wherein selecting to rate match is based at least in part on the signal-to-noise ratio being greater than the threshold.

21. The method of claim 18, further comprising:
receiving, from the UE, an indication of the signal-to-noise ratio associated with the channel.

22. The method of claim 18, further comprising:
receiving, from the UE, an indication for the base station to use doppler spread, or signal-to-noise ratio, or both for determining to select rate matching or puncturing.

23. The method of claim 12, further comprising:
transmitting a value associated with a number of resource elements selected for tone reservation.

24. The method of claim 23, wherein the value is a percentage of a total number of resource elements of the downlink transmission.

25. The method of claim 12, further comprising:
receiving a capability message from the UE indicating that the UE supports rate matching around resource elements used for tone reservation.

26. The method of claim 12, wherein a power associated with a peak-to-average-power ratio reducing signal in the selected resource elements is less than or equal to a threshold multiplied by an average power associated with resource elements of the downlink transmission used for data transmission.

27. The method of claim 12, wherein transmitting the message indicating that tone reservation is applied to the downlink transmission via rate matching further comprises:
transmitting a radio resource control message, a downlink control information message or medium access control (MAC) control element (CE) message comprising the message indicating that tone reservation is applied to the downlink transmission via rate matching.

28. An apparatus for wireless communications, comprising:
a processor;
memory coupled with the processor; and
instructions stored in the memory and executable by the processor to cause the apparatus to:
receive, from a base station, a message indicating that tone reservation is applied to a downlink transmission via rate matching;
receive the downlink transmission comprising data rate matched around selected resource elements used for tone reservation;
identify the selected resource elements used for tone reservation based at least in part on an estimation of a channel between a user equipment (UE) and the base station; and
decode the data of the downlink transmission via rate matching around the selected resource elements used for tone reservation.

29. The apparatus of claim 28, wherein the instructions are further executable by the processor to cause the apparatus to:
receive a value indicating a number of resource elements selected for tone reservation.

30. An apparatus for wireless communications, comprising:
a processor;
memory coupled with the processor; and
instructions stored in the memory and executable by the processor to cause the apparatus to:
determine to apply tone reservation to a downlink transmission from a base station to a user equipment (UE);
select to rate match data of the downlink transmission around selected resource elements for the tone reservation instead of puncturing the data of the downlink transmission;
transmit, to the UE, a message indicating that tone reservation is applied to the downlink transmission via rate matching; and
transmit the downlink transmission comprising the data rate matched around the selected resource elements used for tone reservation.

* * * * *